(12) United States Patent
Motonaga et al.

(10) Patent No.: US 10,021,333 B2
(45) Date of Patent: Jul. 10, 2018

(54) IMAGE SENSOR

(71) Applicant: CANON KABUSHIKI KAISHA, Tokyo (JP)

(72) Inventors: Yusaku Motonaga, Tokyo (JP); Kazuo Yamazaki, Yokohama (JP); Tetsuya Itano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/930,761

(22) Filed: Jun. 28, 2013

(65) Prior Publication Data
US 2014/0014817 A1 Jan. 16, 2014

(30) Foreign Application Priority Data

Jul. 12, 2012 (JP) ................................. 2012-156923
Jun. 12, 2013 (JP) ................................. 2013-124174

(51) Int. Cl.
*H04N 5/378* (2011.01)
*H04N 5/347* (2011.01)

(52) U.S. Cl.
CPC ............. *H04N 5/378* (2013.01); *H04N 5/347* (2013.01)

(58) Field of Classification Search
CPC ........ H04N 5/225; H04N 5/335; H04N 5/378; H04N 5/347; H04N 5/376; H04N 5/3765
USPC ....... 250/208.1, 214 R, 214.1; 348/220, 323, 348/294–312
See application file for complete search history.

(56) References Cited

U.S. PATENT DOCUMENTS

| | | | |
|---|---|---|---|
| 5,880,691 A | | 3/1999 | Fossum et al. |
| 6,160,578 A | * | 12/2000 | Carroll ................. H04N 5/3595 348/222.1 |
| 8,400,543 B2 | * | 3/2013 | Yamauchi ..................... 348/305 |
| 2009/0195681 A1 | * | 8/2009 | Compton ........... H04N 5/23245 348/308 |
| 2009/0244332 A1 | * | 10/2009 | Sonoda ................ H04N 5/3456 348/273 |
| 2010/0103297 A1 | * | 4/2010 | Motomura ......... H04N 5/23232 348/294 |
| 2011/0013033 A1 | * | 1/2011 | Mori .......................... 348/220.1 |
| 2011/0025895 A1 | * | 2/2011 | Hasegawa ............... H03M 1/14 348/294 |
| 2011/0176042 A1 | * | 7/2011 | Kato ................ H01L 27/14609 348/294 |

FOREIGN PATENT DOCUMENTS

| | | |
|---|---|---|
| JP | 2005-347932 A | 12/2005 |
| JP | 2012-060402 A | 3/2012 |

* cited by examiner

*Primary Examiner* — Georgia Y Epps
*Assistant Examiner* — Don Williams
(74) *Attorney, Agent, or Firm* — Cowan, Liebowitz & Latman, P.C.

(57) ABSTRACT

An image sensor comprises a pixel portion formed by arraying pixels including photoelectric conversion portions in a matrix, a plurality of A/D converters which are provided in a one-to-one correspondence to pixel columns of the pixel portion, an adding unit which adds pixel signals from a plurality of pixel columns to each other, and a connecting portion capable of inputting, to an arbitrary A/D converter, a sum signal obtained by adding the pixel signals by the adding unit.

20 Claims, 32 Drawing Sheets

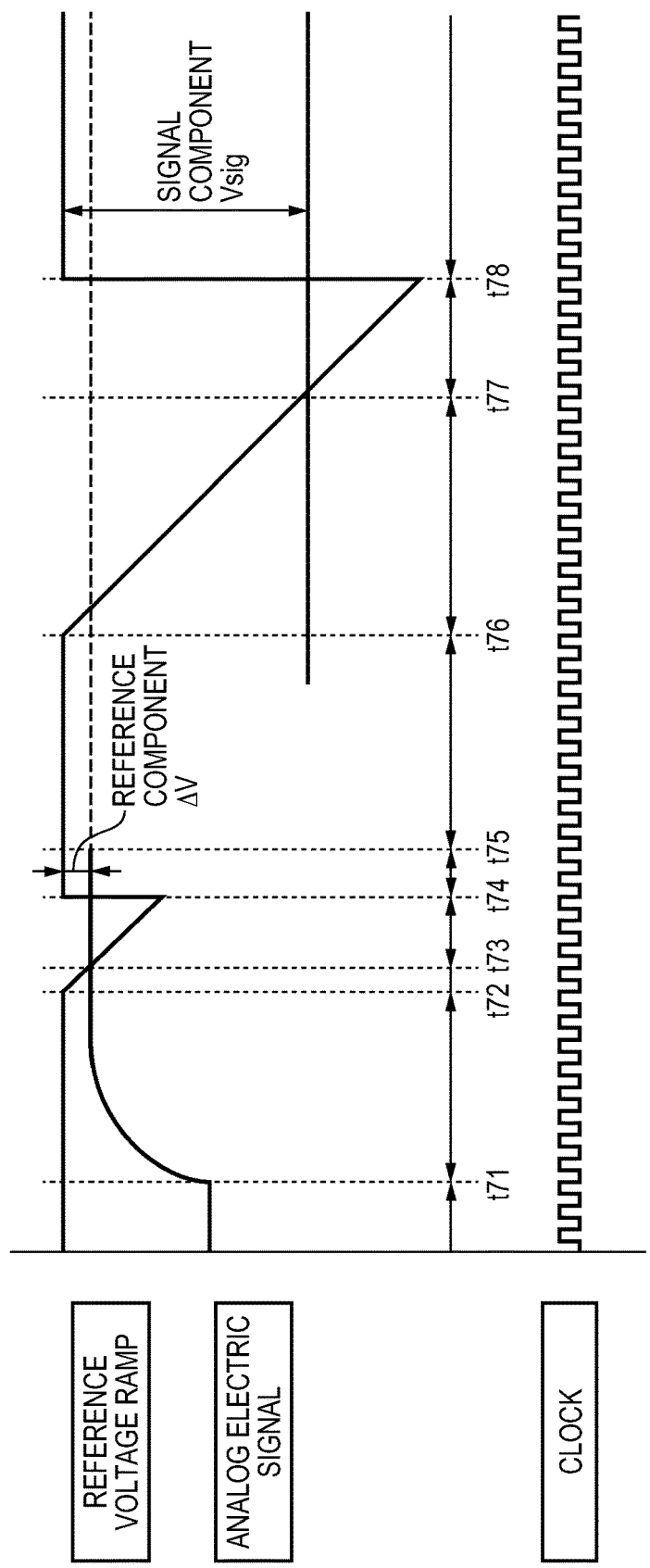

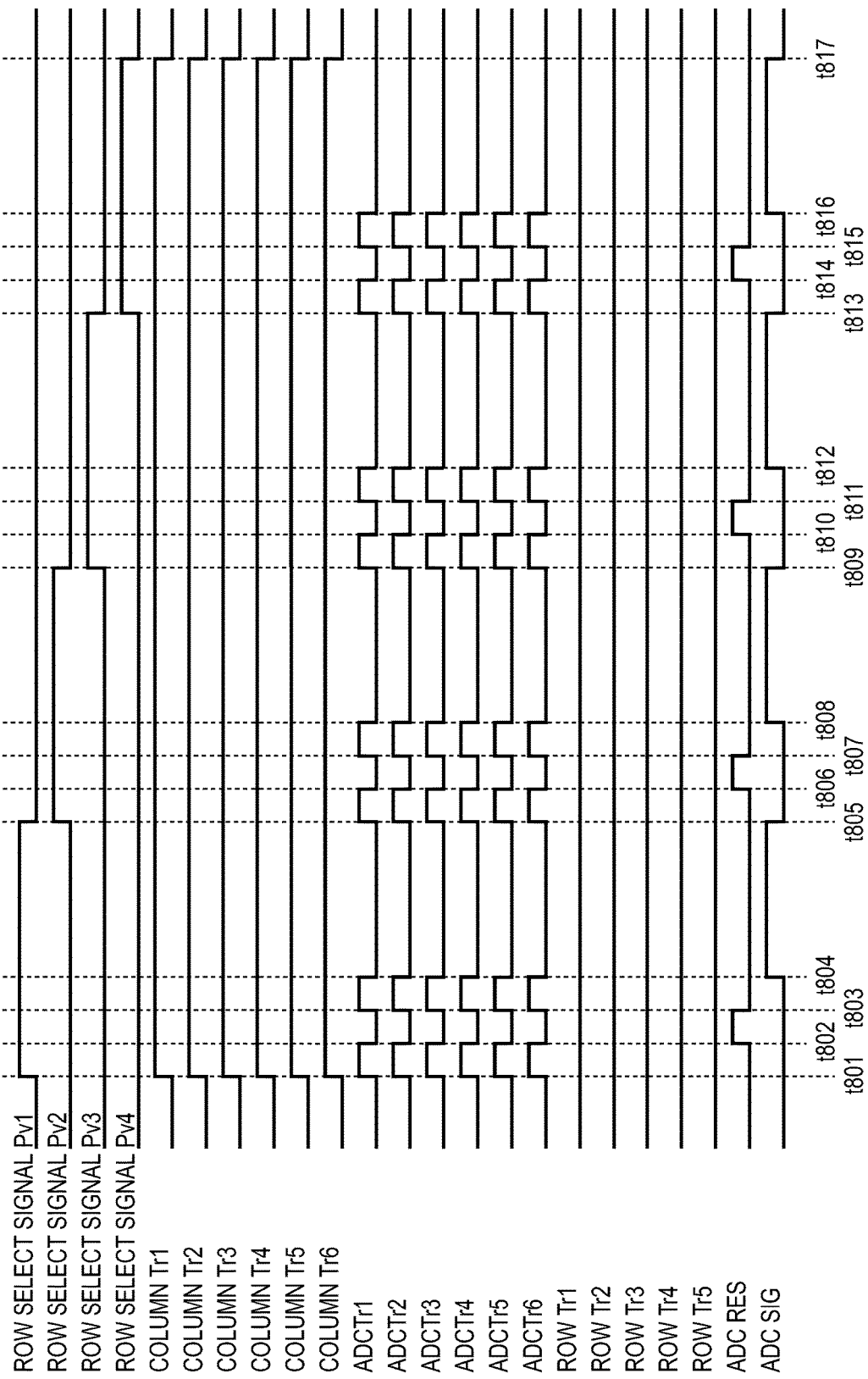

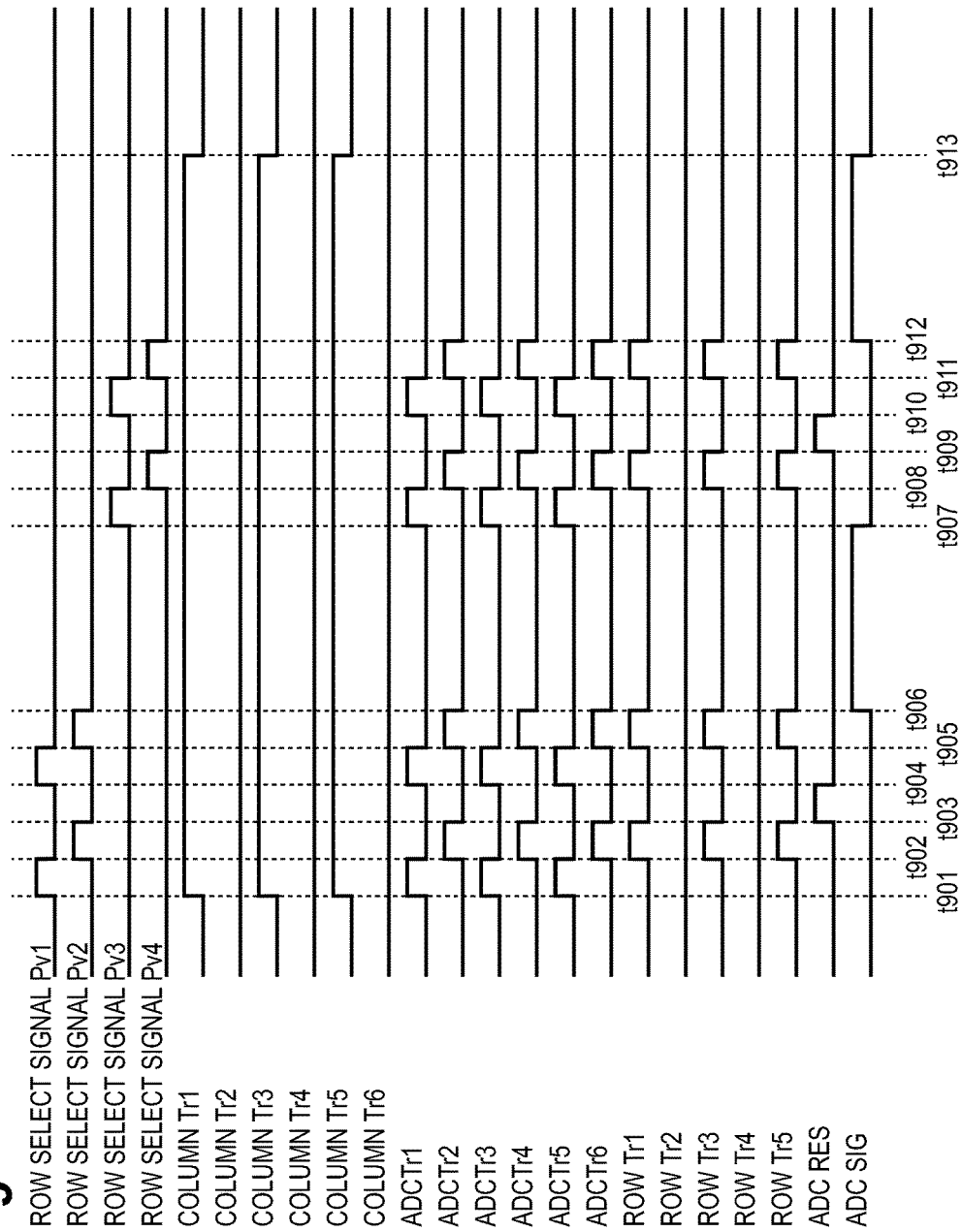

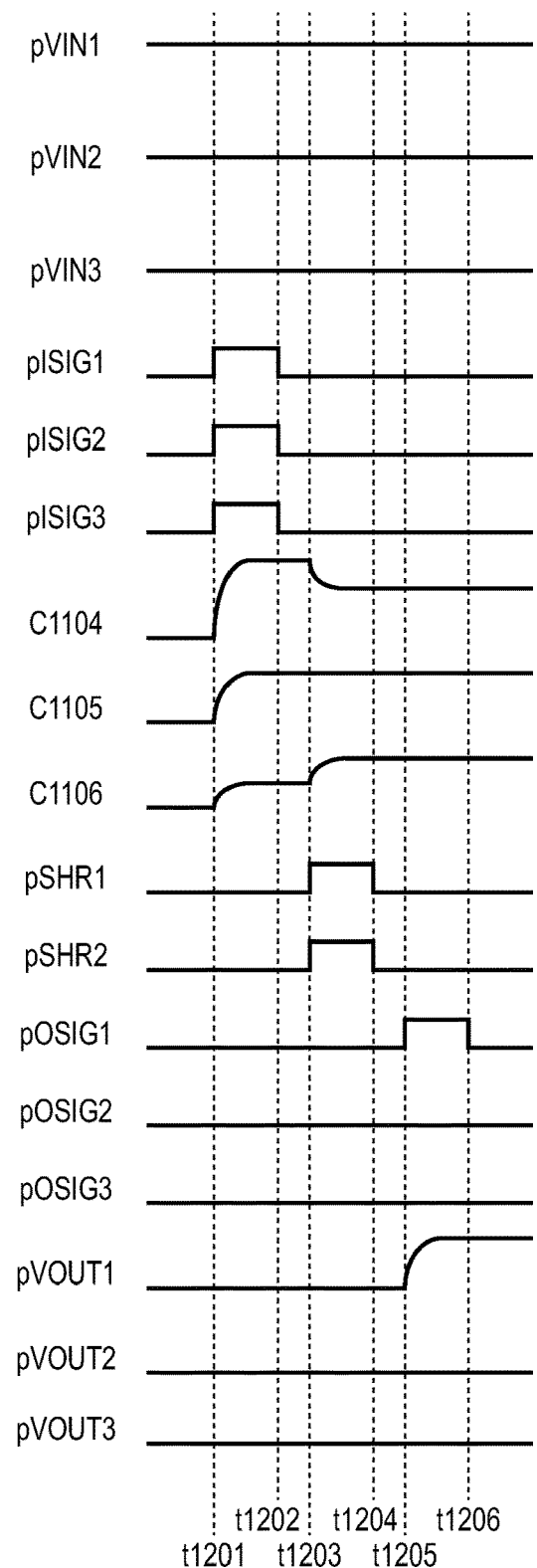

FIG. 12B
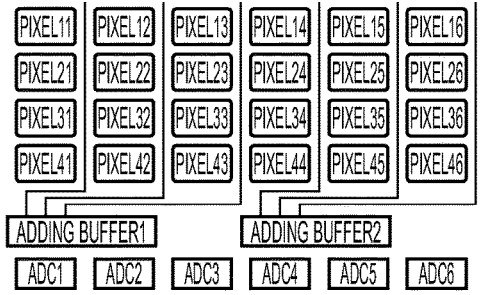
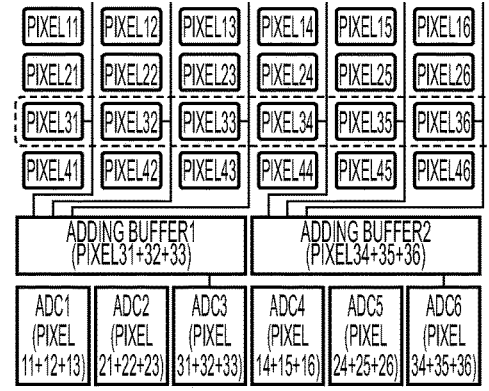
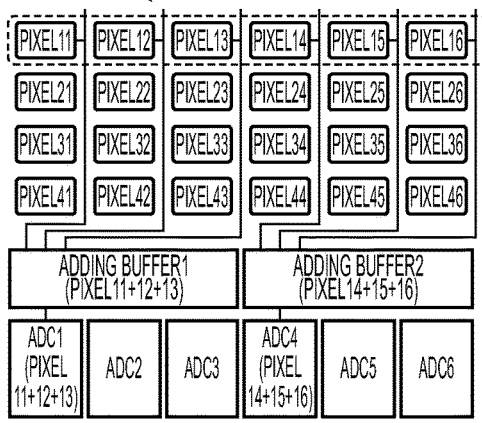
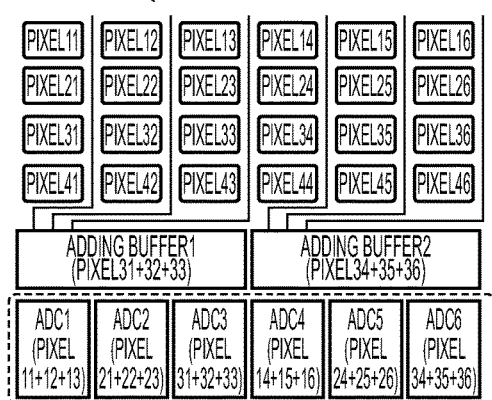
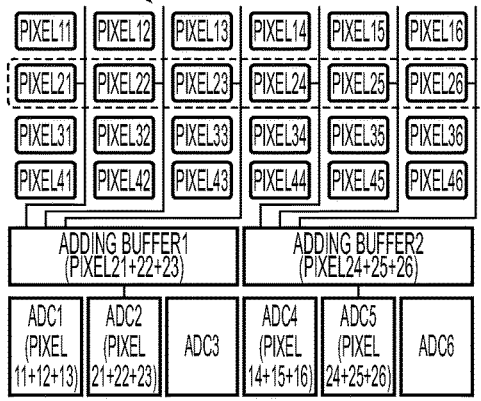

FIG. 14A
14A-1
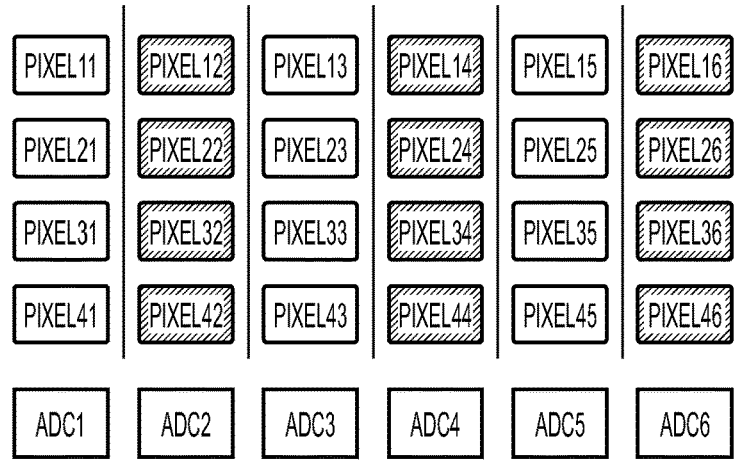
14A-2
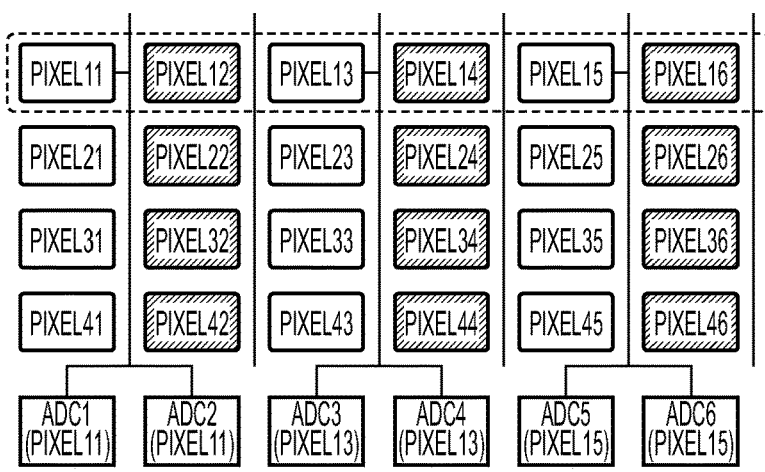
14A-3
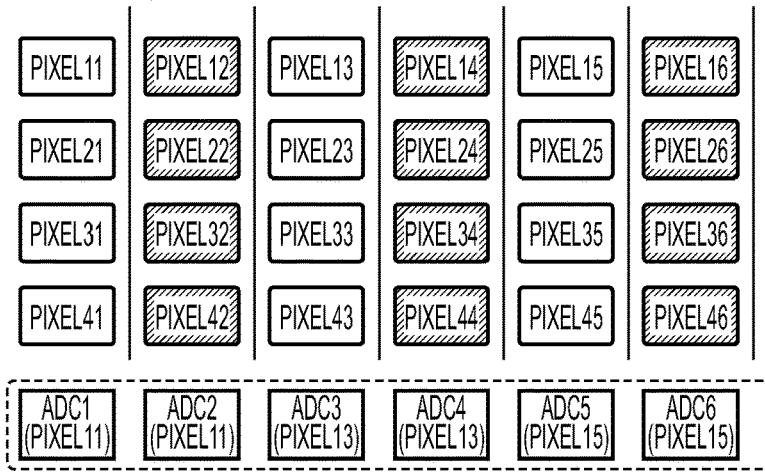

FIG. 14B
14B-1
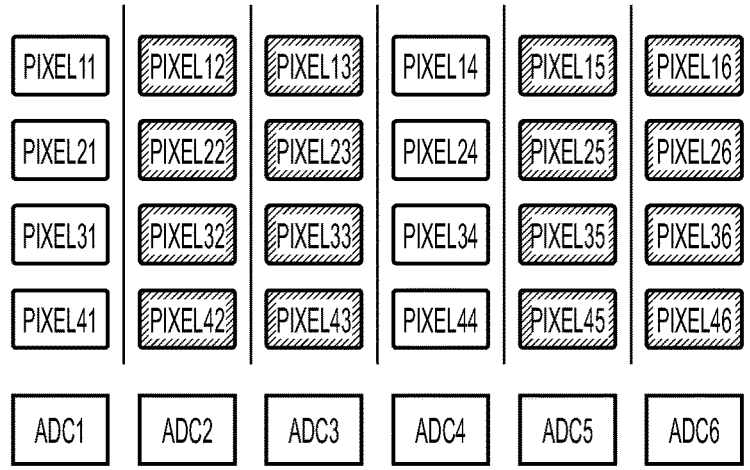
14B-2
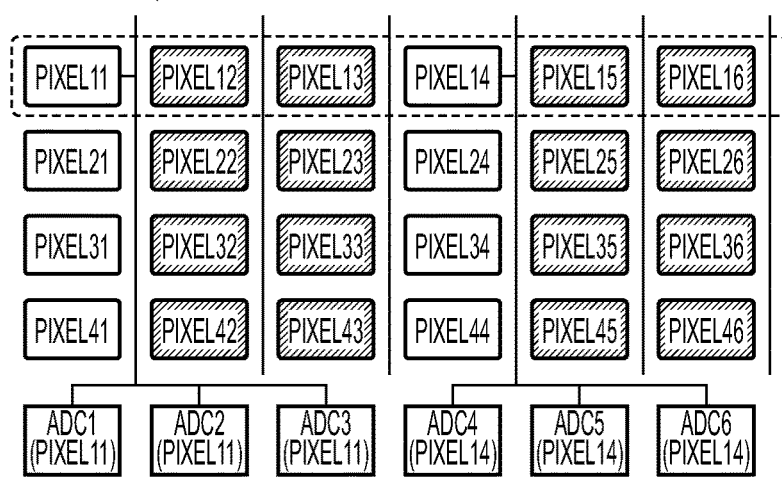
14B-3
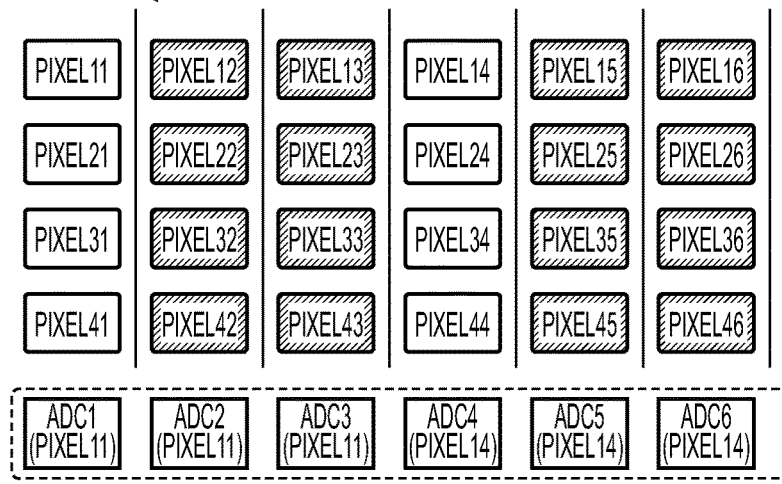

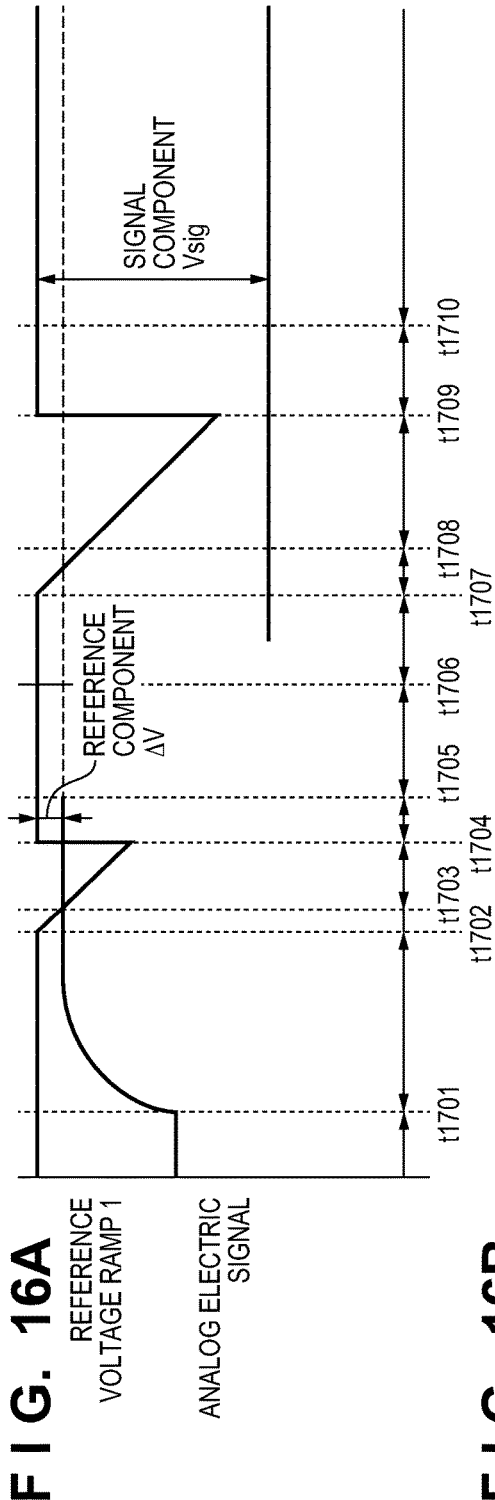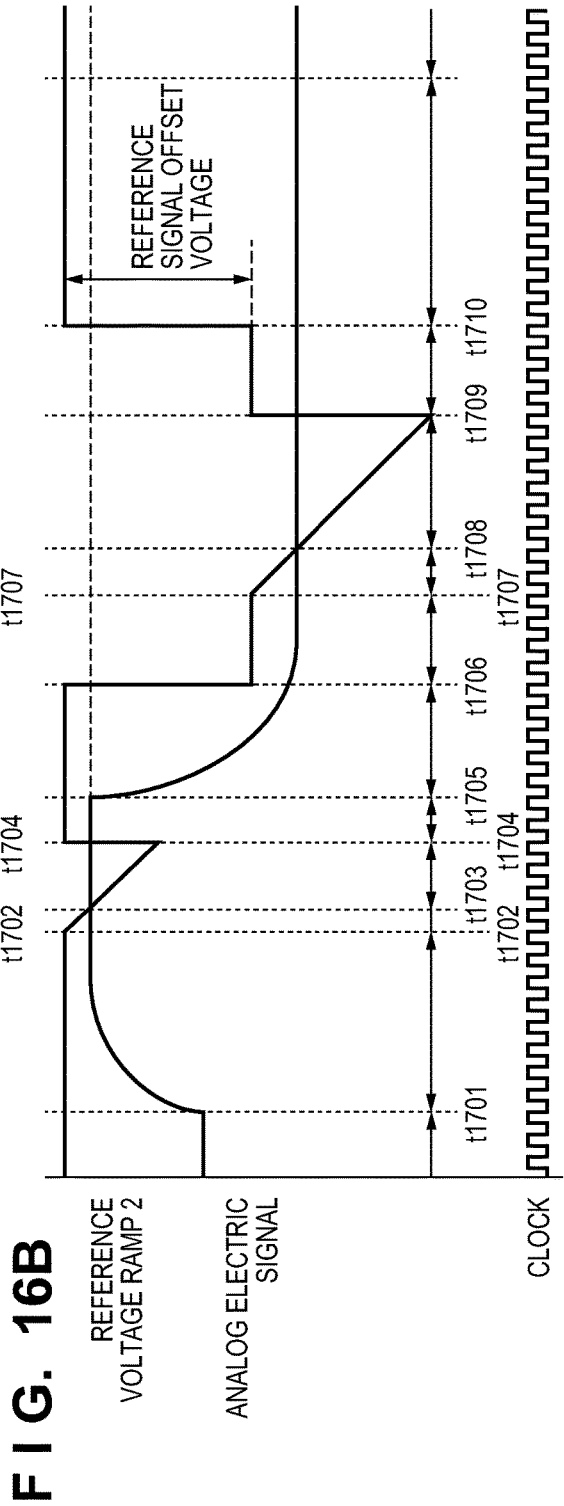

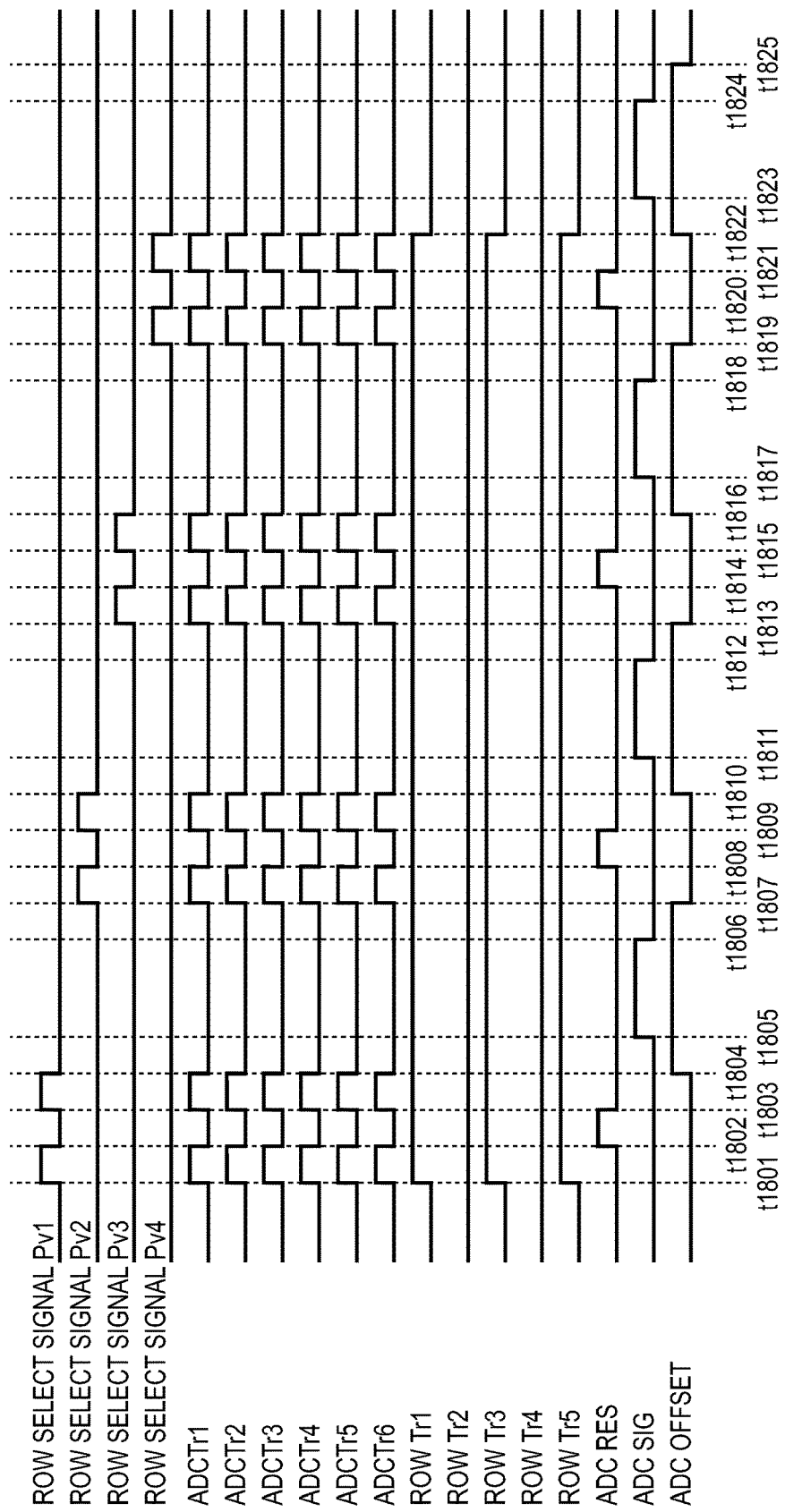

FIG. 18B
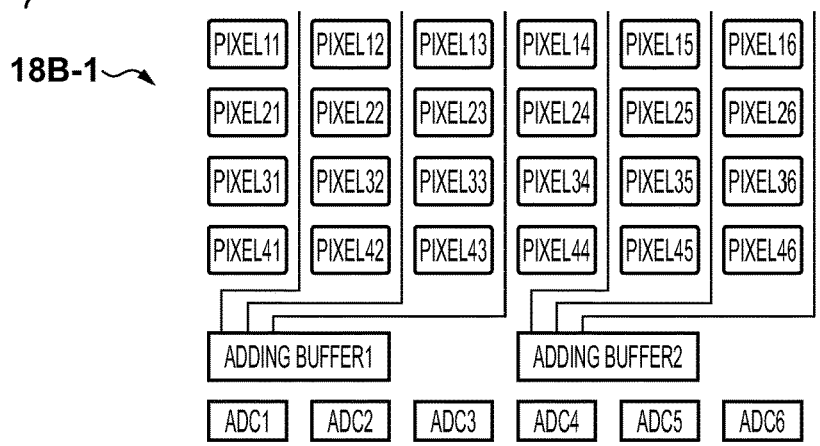
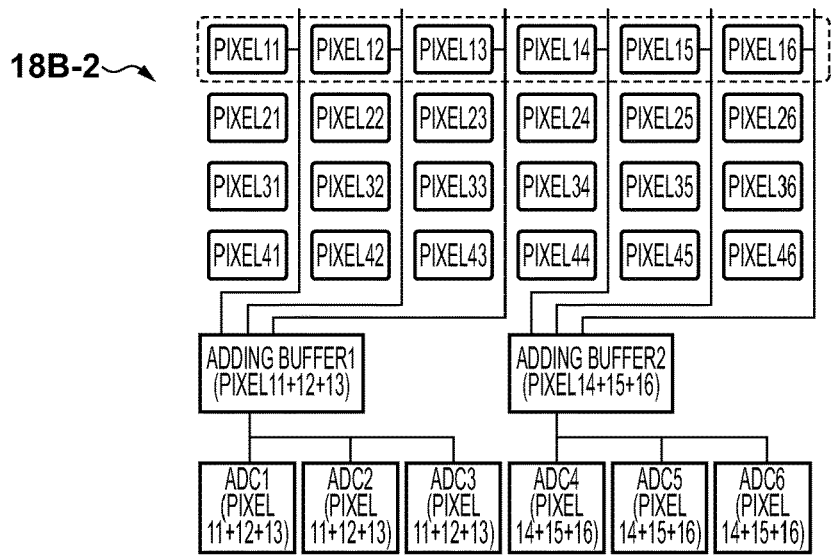
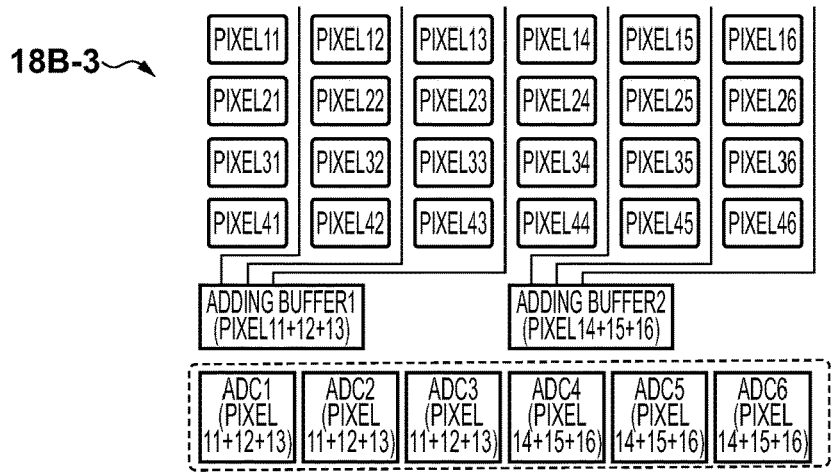

F I G. 20
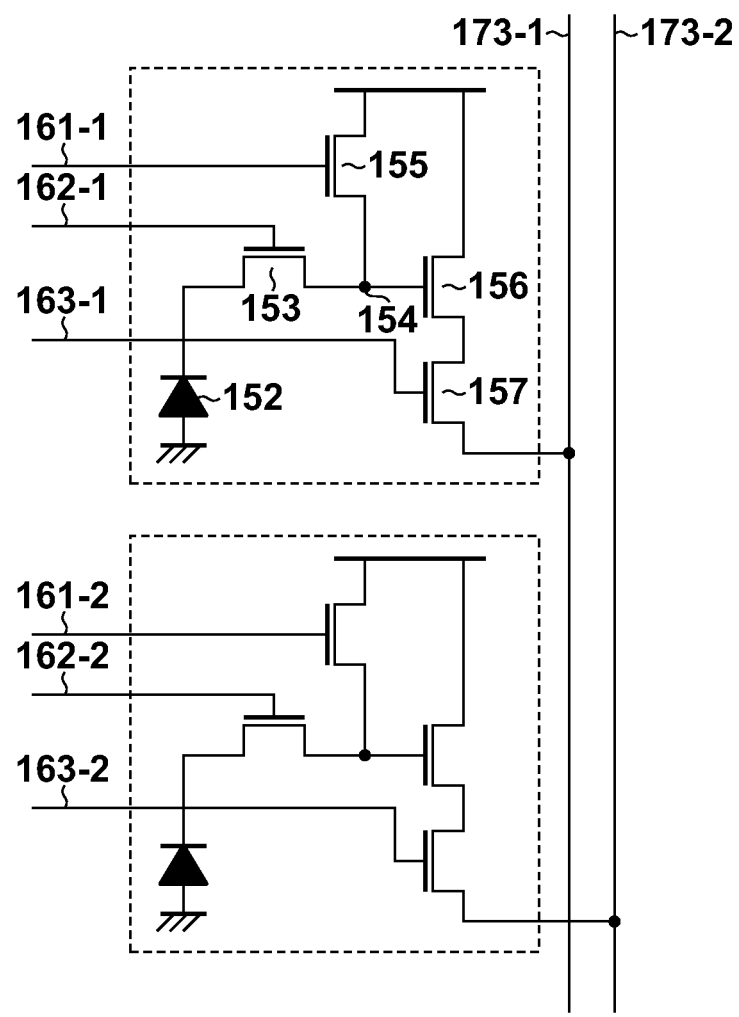

FIG. 29

| R | G1 | R | G1 |
|---|----|---|----|
| G2 | B | G2 | B |
| R | G1 | R | G1 |
| G2 | B | G2 | B |

IMAGE SENSOR

BACKGROUND OF THE INVENTION

Field of the Invention

The present invention relates to a technique of reading out a pixel signal in an image sensor.

Description of the Related Art

Conventionally, as a solid-state image sensor which converts entering light which forms an image of an object into an electric signal, a CMOS sensor obtained by integrating a photodiode and MOS transistor into one chip is used. A CMOS sensor is more advantageous in terms of, for example, low power consumption, low driving power, and speed-up than a CCD. In recent years, a method which exploits the CMOS sensor to increase the readout speed of a pixel signal using an analog/digital converter (ADC) provided for each column has been proposed.

For example, an image sensor having a structure in which two or more ADCs are provided to one pixel column of a pixel portion has been proposed (see Japanese Patent Laid-Open No. 2005-347932). This image sensor performs readout using a plurality of ADCs to improve the readout speed, while the conventional CMOS sensor reads out pixel signals of one pixel column using one ADC.

In another method, a successive approximation image sensor is available as an example in which high-speed ADCs are loaded (see U.S. Pat. No. 5,880,691). A successive approximation image sensor includes a voltage comparator, a digital memory, and a reference voltage generator which uses a digital/analog converter on each column. The voltage comparator receives a signal from a pixel at its one terminal, and a voltage from the reference voltage generator at its other terminal. The reference voltage generator sequentially changes the value based on the comparison result obtained by the comparator.

However, in the conventional method, the circuit scale of an ADC provided for each column increases. Even in the configurations described in Japanese Patent Laid-Open No. 2005-347932 and U.S. Pat. No. 5,880,691, the readout speed of a pixel signal can be increased, but the circuit of the ADC portion has a scale larger than the conventional CMOS sensor, so the chip size considerably increases.

On the other hand, assuming a camera, in most cases, an increase in readout speed of a pixel signal is required not when signal readout of all pixels in an image sensor widely used in still image capture is done but when pixel addition readout or thinning readout is performed for, for example, a moving image capture, photometry, or distance measurement operation.

SUMMARY OF THE INVENTION

The present invention has been made in consideration of the above-mentioned problem, and provides an image sensor capable of increasing the readout speed of a pixel signal while suppressing an increase in circuit scale of an ADC.

According to the present invention, there is provided an image sensor comprising: a pixel portion formed by arraying pixels including photoelectric conversion portions in a matrix; a plurality of A/D converters which are provided in a one-to-one correspondence to pixel columns of the pixel portion; an adding unit which adds pixel signals from a plurality of pixel columns to each other; and a connecting portion capable of inputting, to an arbitrary A/D converter, a sum signal obtained by adding the pixel signals by the adding unit.

Further features of the present invention will become apparent from the following description of exemplary embodiments with reference to the attached drawings.

BRIEF DESCRIPTION OF THE DRAWINGS

FIG. 6 is a timing chart of pixel signal readout in the first embodiment;

FIG. 7 is a timing chart of all-pixel readout driving in the first embodiment;

FIG. 9 is a timing chart of ½ thinning driving in the first embodiment;

FIG. 11 is a timing chart of the operation of the adding buffer;

FIGS. 12A and 12B are views for explaining an operation in the first embodiment;

FIGS. 14A and 14B are views for explaining an operation in the second embodiment;

FIGS. 16A and 16B are timing charts of pixel signal readout in the second embodiment;

FIG. 17 is a timing chart of ½ thinning driving in the second embodiment;

FIGS. 18A and 18B are views for explaining an operation in the second embodiment;

FIG. 20 is a circuit diagram illustrating an example of the configuration of a pixel portion shown in FIG. 19;

FIG. 29 is a view showing the Bayer arrangement of a solid-state image sensor.

DESCRIPTION OF THE EMBODIMENTS

Embodiments of the present invention will be described in detail below with reference to the accompanying drawings.

First Embodiment

Figure 1:
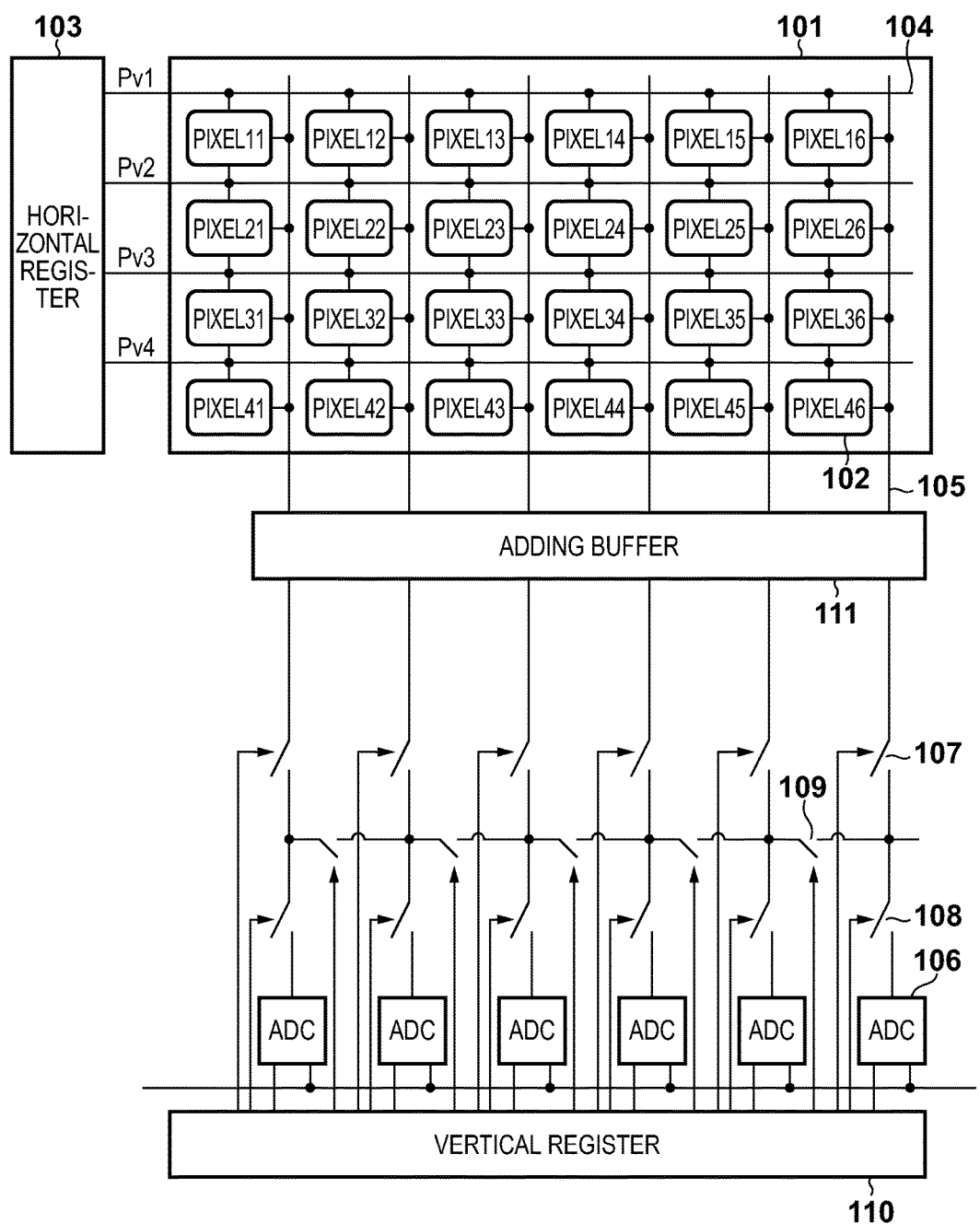
FIG. 1 is a circuit diagram showing a solid-state image sensor according to the first embodiment of the present invention.
Figure 29:
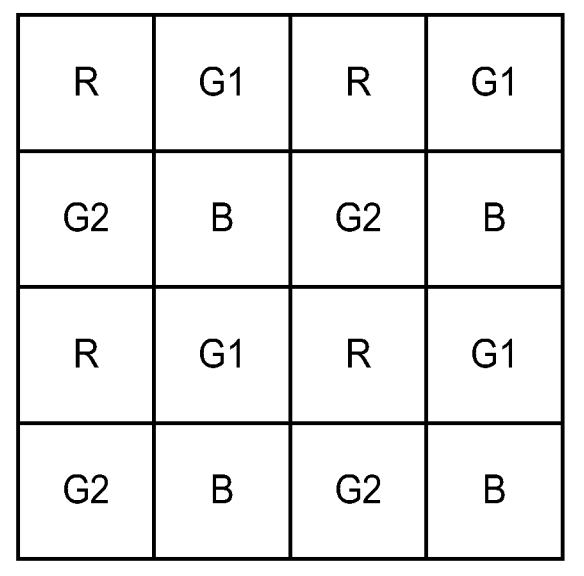

FIG. 1 is a circuit diagram showing a solid-state image sensor according to the first embodiment of the present invention. A pixel portion 101 includes photoelectric conversion elements which convert incident light beams into charges, and a plurality of pixels 102 which output charges as analog electric signals are arranged in an N (rows)×M (columns) matrix. FIG. 1 illustrates an example of a pixel portion in which 6 pixels are arrayed in the row direction, and 4 pixels are arrayed in the column direction. Note that the pixels 102 have color filters arranged in the Bayer arrangement, as shown in FIG. 29, and output pixel values corresponding to the colors of these color filters. Note that referring to FIG. 29, G filters arranged on the same column as B filters are defined as G1 filters, and G filters arranged on the same column as R filters are defined as G2 filters. As shown in FIG. 29, R and G columns on which R and G2 pixels are arranged, and G and B columns on which G1 and B pixels are arranged are alternately repeated. Although a plurality of sets of R and G columns are continuously aligned for the sake of easy understanding while G and B columns are not shown in the following embodiments, G and B columns configured in the same way as in R and G columns are arranged between R and G columns in practice.

The pixels 102 are connected to a horizontal register 103 via a row select line 104, and 6 pixels connected to the selected row select line 104 are simultaneously selected. Note that reference symbols Pv1 to Pv4 denote row select lines 104 on the first to fourth rows. When the row select line 104 is high, a row is selected, so an analog electric signal is output from the pixel 102 to a column output line 105. Also, when the row select line 104 is low, row selection is canceled, and the pixels 102 and column output line 105 are disconnected from each other. By selecting Pv1 to Pv4 of the row select line 104 for each row, analog electric signals from pixels on the first to fourth rows are sequentially output to the column output line 105.

An A/D converter (ADC) 106 converts an analog electric signal output to the column output line 105 into a digital signal. An adding buffer 111, column transistor 107, and AD transistor 108 are interposed between each column output line 105 and the A/D converter 106. Also, a row transistor 109 is interposed between the column transistor 107 and the AD transistor 108, and can be connected to or disconnected from other columns. The column transistor 107, AD transistor 108, and row transistor 109 control connection/disconnection using a vertical register 110.

If the column transistor 107 is connected, an analog electric signal from the column output line 105 can be read out. However, if the column transistor 107 is disconnected, an analog electric signal from the column output line 105 cannot be read out. If the AD transistor 108 is connected, the A/D converter 106 can read an analog electric signal. However, if the AD transistor 108 is disconnected, the A/D converter 106 cannot read an analog electric signal. The row transistor 109 uses an analog electric signal output from a pixel on one column to the column output line 105 in A/D conversion using the A/D converter 106 on another column.

The detailed structure of the pixels 102 shown in FIG. 1 will be described below with reference to FIG. 2. A photodiode (to be referred to as a PD hereinafter) 301 generates a charge corresponding to incident light by photoelectric conversion. A transfer transistor 302 is arranged between the PD 301 and a floating diffusion (to be referred to as FD hereinafter) region 303, so the PD 301 and FD region 303 are disconnected from each other if a transfer control pulse pTX is low, while the PD 301 and FD region 303 are connected to each other and a charge generated by the PD 301 is transferred to the FD region 303 if the transfer control pulse pTX is high.

A reset transistor 304 is arranged between a reset power supply and the FD region 303, and is disconnected if a reset control pulse pRES is low. However, the reset power supply and the FD region 303 are connected to each other if the reset control pulse pRES is high. At this time, the FD region 303 has the same potential as that of the reset power supply. Again at this time, if the transfer control pulse pTX is high, the PD 301 also has the same potential as that of the reset voltage. With this arrangement, a reset operation is performed so that each unit has the same potential as the reset voltage when the reset control pulse pRES is set high.

A select transistor 305 is arranged between a pixel power supply and an amplifier transistor 306, and the amplifier transistor 306 and pixel power supply are disconnected from each other if a selection control pulse pSEL is low, while they are connected to each other if the selection control pulse pSEL is high. Note that if the selection control pulse pSEL is high, the amplifier transistor 306 amplifies a voltage corresponding to the charge held in the FD region 303, and outputs it to the column output line 105 as an analog electric signal.

A capacitance 309 is used to hold an analog electric signal during the period in which an analog electric signal output to the column output line 105 is A/D converted. Also, an output line transistor 308 is arranged between the column output line 105 and the capacitance 309, and the column output line 105 and capacitance 309 are disconnected from each other if a control pulse pSIG is low, while they are connected to each other if the control pulse pSIG is high.

A detailed operation shown in FIG. 2 will be described below with reference to FIG. 3. An operation of outputting an analog electric signal of a reference component, and an analog electric signal of a signal component to the column output line will be described herein.

At time t401, a selection control pulse pSEL on the row of readout pixels is changed to "high". With this operation, the voltage of the FD region 303, which is input to the gate of the amplifier transistor 306 of the readout row, is amplified and output to the column output line 105.

At time t402, the transfer control pulse pTX and reset control pulse pRES are changed to "high". With this operation, the voltages of the reset power supply and PD 301 become equal to that of the FD region 303, so the PD 301 and FD region 303 are reset.

At time t403, the transfer control pulse pTX and reset control pulse pRES are changed to "low". With this operation, the reset operation of the PD 301 and FD region 303 ends. Also, the charge storage of the PD 301 starts the moment the reset operation ends.

At time t404, the control pulse pSIG is changed to "high". With this operation, the column output line 105 and capacitance 309 are electrically connected to each other, so an analog electric signal of a reference component output to the column output line 105 is input to the capacitance 309. At time t405, the control pulse pSIG is changed to "low". With this operation, the column output line 105 and capacitance 309 are electrically disconnected from each other, and the capacitance 309 holds the voltage of the analog electric signal at this time. Also, the voltage of the capacitance 309 held at time t405 is read out by the ADC 106 in the succeeding stage.

At time t406, the transfer control pulse pTX is changed to "high". With this operation, the charge stored by photoelectric conversion in the PD 301 is transferred to the FD region 303. At time t407, the transfer control pulse pTX is changed to "low". With this operation, the transfer operation of the charge from the PD 301 to the FD region 303 ends. The period from time t403 to time t407 is the charge storage time. Also, at time t407, a voltage corresponding to the charge of the signal component stored in the storage time is amplified by the amplifier transistor 306, and output to the column output line 105.

At time t408, the control pulse pSIG is changed to "high". With this operation, the column output line 105 and capacitance 309 are electrically connected to each other, so an analog electric signal of a signal component output to the column output line 105 is input to the capacitance 309. At time t409, the control pulse pSIG is changed to "low". With this operation, the column output line 105 and capacitance 309 are electrically disconnected from each other, and the capacitance 309 holds the voltage of the analog electric signal at this time.

At time t410, the selection control pulse pSEL on the row of readout pixels is changed to "low". With this operation, the output of an analog electric signal from the amplifier transistor 306 of the readout row to the column output line 105 stops. A pixel signal can be read out by repeating the same operation for pixels on the next row.

Figure 4:
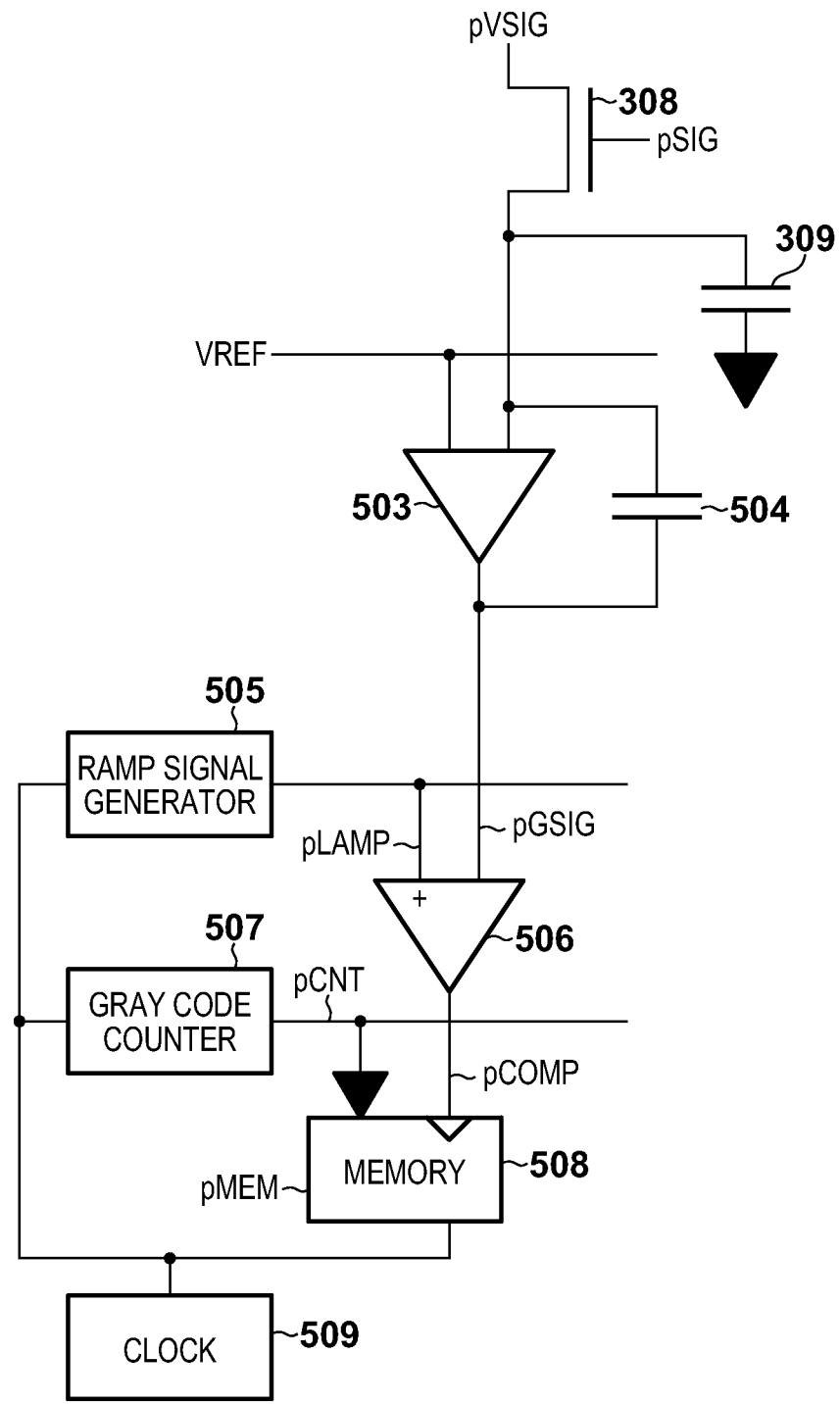
FIG. 4 is a circuit diagram showing the configuration of an A/D converter in the first embodiment.

The detailed structure of the ADC 106 shown in FIG. 1 will be described below with reference to FIG. 4. The output line transistor 308 and capacitance 309 shown in FIG. 4 are identical to those shown in FIG. 2.

An amplifier 503 amplifies the difference voltage between an analog electric signal ASIG and a reference voltage VREF, and outputs it to a comparator 506. Note that the amplification factor of the amplifier 503 is determined by a capacitance 504.

A ramp signal generator 505 outputs a ramp wave (ramp signal) to the comparator 506. The comparator 506 compares an amplified analog electric signal pGSIG with a ramp signal pLAMP from the ramp signal generator 505, and inverts an output signal pCOMP as the voltage magnitude is reversed. In this case, "low" is output if the voltage of the ramp signal pLAMP from the ramp signal generator is lower than that of the amplified analog electric signal pGSIG, while "high" is output if the voltage of the ramp signal pLAMP from the ramp signal generator is high.

A gray code counter 507 starts its count operation at the timing of the start of the operation of the ramp signal generator 505 and inputs a count value to a memory 508. The memory 508 holds the count value of the gray code counter 507 if a signal input from the comparator 506 changes to "high".

After the output from the ramp signal generator 505 operates in one period, the count value held in the memory 508 is read out. A clock 509 generates a synchronization signal of the ramp signal generator 505 and gray code counter 507.

Figure 5:
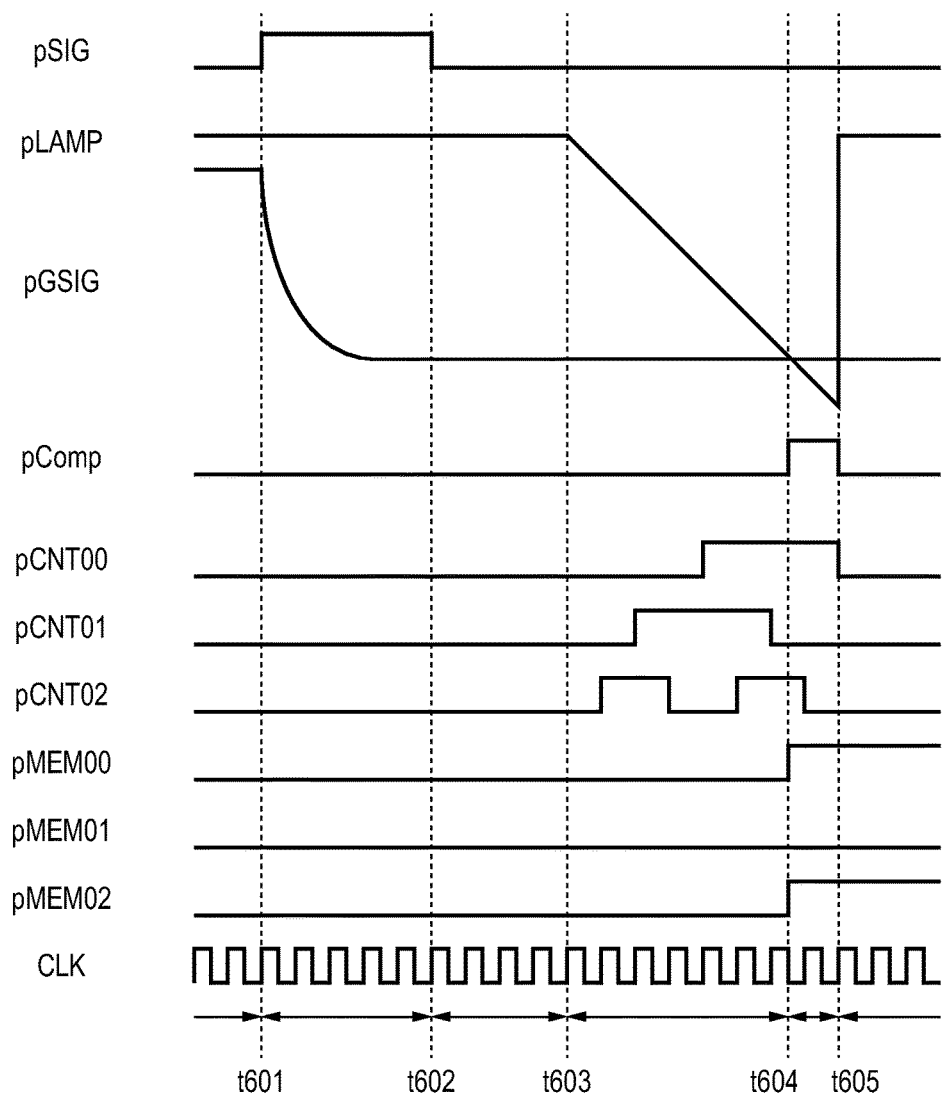
FIG. 5 is a timing chart of driving of the A/D converter.

The operation of the ADC 106 which converts an analog electric signal shown in FIG. 4 into a digital signal will be described below with reference to FIG. 5.

At time t601, the control pulse pSIG is changed to "high". With this operation, the voltage of an amplified analog electric signal pVSIG shown in FIG. 4 is charged into the capacitance 309. At the same time, the analog electric signal pVSIG is input to the amplifier 503 shown in FIG. 4, and a signal pGSIG obtained by amplifying the analog electric signal pVSIG is output to the comparator 506. At time t602, the control pulse pSIG is changed to "low". With this operation, the capacitance 309 holds the voltage of the analog electric signal pVSIG.

At time t603, the ramp signal pLAMP is output from the ramp signal generator 505. Also, a gray code signal pCNT is simultaneously output from the gray code counter 507 to the memory 508. A 3-bit gray code counter will be exemplified herein for the sake of easy understanding. Also, the gray code signal pCNT changes in synchronism with the voltage of the ramp signal pLAMP. This count operation is done until time t605.

Note that the comparator 506 compares the signal pGSIG with the ramp signal pLAMP to change the output signal pCOMP to "low" if the ramp signal pLAMP is lower than the signal pGSIG, or change the output signal pCOMP to "high" if the ramp signal pLAMP is higher than the signal pGSIG. When the output signal pCOMP changes to "high" at time t604, the memory 508 stores the gray code signal pCNT input at this time.

The readout operation of a pixel signal using the A/D converter 106 will be described below. Referring to FIG. 1, a reference component ΔV (N signal) containing noise of a pixel signal is read out from each pixel 102 on the selected row of the pixel portion 101 as an analog electric signal in the first readout operation, and a signal component Vsig (S signal) is read out from this pixel 102 as an analog electric signal in the second readout operation. The reference component ΔV and signal component Vsig are input to the A/D converter 106 via the column output line 105.

The reference component ΔV read out in the first readout operation contains, as an offset, fixed pattern noise which varies for each pixel 102. In the second readout operation, Vsig+ΔV obtained by adding the reference component ΔV and the signal component Vsig corresponding to the amount of incident light for each pixel 102 is read out. A target signal value Vsig is obtained based on the difference between the second readout result (Vsig+ΔV) and the first readout result (ΔV).

When the first A/D conversion process is performed for the reference component ΔV, a signal obtained by adding the signal component Vsig to the reference component ΔV is processed in the second A/D conversion process.

The detailed operation of an A/D converter will be described below with reference to FIG. 6. A/D conversion of a reference component ΔV will be described first.

At time t71, an analog electric signal of a reference component ΔV is input from the pixel 102. At times t72 to t74, a reference voltage RAMP is changed by a predetermined amount for each unit time. During this operation, the reference voltage RAMP and the analog electric signal are compared, and time t73 at which their voltages become equal is measured. Note that the product of the amount of change in reference voltage RAMP per unit time, and times t72 to t73 is converted into digital data as the reference component ΔV.

A/D conversion of a signal component Vsig will be described next. At time t75, the signal component Vsig is input from the pixel 102. At times t76 to t78, the reference voltage RAMP is changed by a predetermined amount for each unit time. During this operation, the reference voltage RAMP and the analog electric signal are compared, and time t77 at which their voltages become equal is measured. Note that the product of the amount of voltage change of the reference voltage RAMP per unit time, and times t76 to t78 is converted into digital data as the reference component ΔV.

The difference between the second readout result (Vsig+ ΔV) and the first readout result (ΔV) obtained at this time is output as a pixel signal value.

All-pixel readout driving when the image sensor shown in FIG. 1 is used will be described below. In all-pixel readout driving, an analog electric signal from the pixel 102 of each column is read out by the A/D converter 106 on the column of the pixel 102.

Therefore, the transistors 107 and AD transistors 108 on all columns are changed to "high" to set them in a connected state, while the transistors 109 on all rows are changed to "low" to set them in a disconnected state. With this operation, in the image sensor shown in FIG. 1, a pixel signal from the pixel 102 is read out by an A/D converter on the column of the pixel 102.

A detailed operation in all-pixel readout will be described next with reference to FIG. 7. First, at time t801, row select signal Pv1, column Tr1 to column Tr6 serving as the control pulses of the column transistors 107, and ADCTr1 to ADCTr6 serving as the control pulses of the AD transistors 108 are changed to "high". When row select signal Pv1 changes to "high", analog electric signals from pixels 11 to 16 on the first row are output to the column output line 105 of each column.

Also, when column Tr1 to column Tr6 and ADCTr1 to ADCTr6 change to "high", an analog electric signal from the column output line 105 of each column is output to the A/D converter 106 on this column. The state of the A/D converter 106 at this time corresponds to that at time t71 in FIG. 6. Also, times t801 to t802 correspond to times t71 to t72, respectively, of FIG. 6, and an analog electric signal is input to the A/D converter 106 in the period of times t801 to t802.

At time t802, the readout operation of the reference component ΔV corresponding to time t72 in FIG. 6 from the pixel 102 on the first row starts. Note that ADCTr1 to ADCTr6 are changed to "low" to disconnect the column output line 105 and A/D converter 106 from each other. With this operation, the A/D converter 106 holds the voltage of the analog electric signal of the reference component ΔV. At the same time, an operation of comparing the analog electric signal of the reference component ΔV, and the reference voltage RAMP starts.

At time t803, the readout operation of the reference component ΔV from the pixel 102 on the first row ends. The operation of the A/D converter 106 corresponds to the state at time t74 in FIG. 6. Also, ADCTr1 to ADCTr6 are changed to "high" to start the readout operation of the signal components Vsig from the pixels 102 on the first row.

At time t804, the readout operation of the signal component Vsig corresponding to time t76 in FIG. 6 from the pixel 102 on the first row starts. Note that ADCTr1 to ADCTr6 are changed to "low" to disconnect the column output line 105 and A/D converter 106 from each other. With this operation, the A/D converter 106 holds the voltage of the analog electric signal of the signal component Vsig. At the same time, an operation of comparing the analog electric signal of the signal component Vsig, and the reference voltage RAMP starts.

Also, times t804 to t805 correspond to times t76 to t78 in FIG. 6, and an analog electric signal is input to the A/D converter 106 in the period of times t804 to t805. At time t805, the operation of comparing the analog electric signal of the signal component Vsig, and the reference voltage RAMP ends. Also, row select signal Pv1 is changed to "low" to change row select signal Pv2, column Tr1 to column Tr6, and ADCTr1 to ADCTr6 to "high". With this control operation, the readout operation of the signal value of the pixel 102 on the second row starts.

Subsequently, analog electric signals of reference components and signal components are A/D converted to read out signal values, as in the first TOW.

A driving method of ½ thinning readout in the row direction when the image sensor shown in FIG. 1 is used will be described below. In this embodiment, in pixel thinning driving of the image sensor, readout pixel signals are distributed and input to the A/D converter 106 on the readout pixel column, and the A/D converter 106 on the thinning pixel column, and A/D converted. Therefore, as the amount of thinning increases, the number of A/D converters that can be used on one readout column can be increased, so the count of A/D conversion required to read out pixel signals of one frame can be decreased to shorten the time for A/D conversion.

Figure 8A:
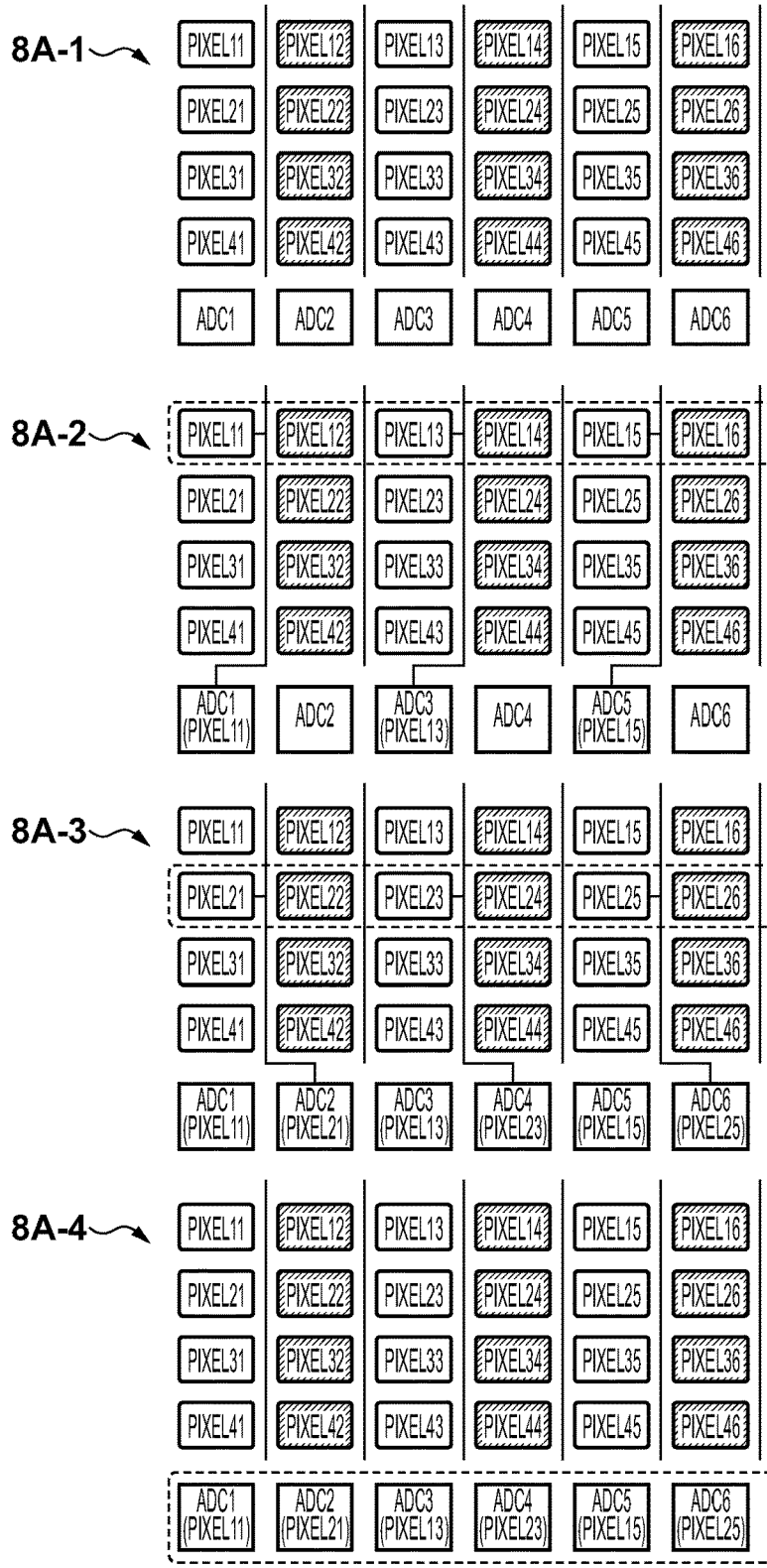
FIGS. 8A and 8B are views for explaining an operation in the first embodiment.
Figure 8B:
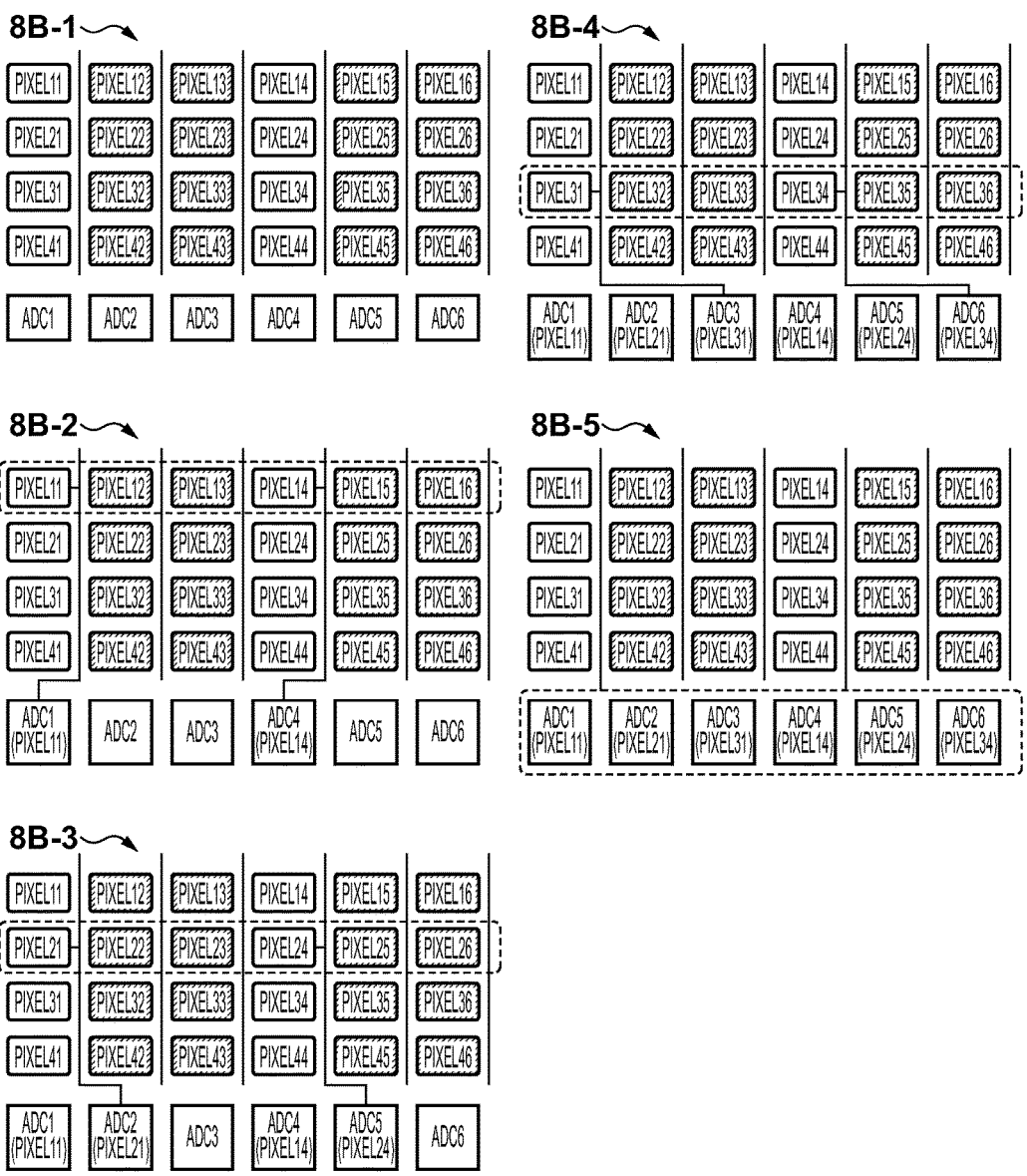

The overview of an operation according to this embodiment will be described below with reference to FIGS. 8A and 8B. A ½ thinning operation will be described with reference to FIG. 8A. As shown in FIG. 8A-1, in this case, pixel signals on the first, third, and fifth columns are read out, while those on the second, fourth, and sixth columns are not read out. First, referring to FIG. 8A-2, pixel signals on the first row are transferred to the A/D converters on the first, third, and fifth columns. Then, referring to FIG. 8A-3, pixel signals on the second row are transferred to the A/D converters on the second, fourth, and sixth columns. Referring to FIG. 8A-4, the readout operation of the A/D converters starts.

With one readout operation mentioned above, signals corresponding to two rows can simultaneously be A/D converted. Also, with a ⅓ thinning operation explained in FIG. 8B, signals corresponding to three rows can simultaneously be A/D converted.

In the conventional image sensor, the A/D converter 106 on the column on which each pixel is present A/D converts a signal from the pixel 102. Therefore, as the amount of addition and the amount of thinning in the row direction increase, the number of A/D converters which have not yet read out pixel signals increases. However, in this embodiment, in addition/column thinning readout driving in the row direction, pixel signals are also input to and read out from the A/D converter 106 on the thinning column. This makes it possible to increase the number of rows on which A/D conversion is performed at once (simultaneously) in accordance with the amount of column thinning.

A detailed operation in ½ thinning readout driving in the row direction will be described below with reference to FIG. 9.

First, analog electric signals of reference components ΔV from the pixels 102 on the first row are input to the A/D converters 106. At time t901, row select signal Pv1, column Tr1, column Tr3, and column Tr5 of column Tr1 to column Tr6, and ADCTr1, ADCTr3, and ADCTr5 of ADCTr1 to ADCTr6 change to "high". When row select signal Pv1 changes to "high", analog electric signals of reference components ΔV of pixels 11, 13, and 15 on the first row are output to the column output lines 105 on the first, third, and fifth columns. Also, when column Tr1, column Tr3, column Tr5, ADCTr1, ADCTr3, and ADCTr5 change to "high", analog electric signals from the column output lines on the first, third, and fifth columns are output to the A/D converters 106 of the respective columns.

At time t902, the pixels 102 on the first row and the A/D converters 106 are disconnected from each other, and analog electric signals of reference components ΔV from the pixels 102 on the second row are input to the A/D converters 106. First, Pv1, ADCTr1, ADCTr3, and ADCTr5 are changed to "low". With this control operation, the A/D converters on the first, third, and fifth columns hold the voltages of the analog electric signals of the reference components ΔV from pixels 11, 13, and 15 on the first row. Then, Pv2, ADCTr2, ADCTr4, and ADCTr6 of ADCTr1 to ADCTr6, and row Tr1, row Tr3, and row Tr5 of row Tr1 to row Tr5 are changed to "high". When row select signal Pv2 changes to "high", the analog electric signals of the reference components ΔV from pixels 21, 23, and 25 on the second row are output to the column output lines 105 on the first, third, and fifth columns.

At time t903, the pixels 102 on the second row and the A/D converters 106 are disconnected from each other, and the readout operation of analog electric signals of reference components ΔV from the pixels 102 on the first and second rows, which are held in the A/D converters 106, starts.

First, Pv2, ADCTr2, ADCTr4, ADCTr6, row Tr1, row Tr3, and row Tr5 are changed to "low". With this control operation, the A/D converters on the second, fourth, and sixth columns hold the voltages of the analog electric signals of the reference components ΔV from pixels 21, 23, and 25 on the second row. Then, ADC RES is changed to "high" to start the readout operation of analog electric signals of reference components from the pixels on the first and second rows upon the operation at time t72 in FIG. 6.

At time t904, the readout operation of analog electric signals of reference components ΔV from the pixels on the first and second rows ends, and the readout operation of the signal components Vsig is performed. First, ADC RES is changed to "low" to end the reference component readout operation of the A/D converters 106.

As in time t901, row select signal Pv1, column Tr1, column Tr3, and column Tr5 of column Tr1 to column Tr6, and ADCTr1, ADCTr3, and ADCTr5 of ADCTr1 to ADCTr6 are changed to "high". When row select signal Pv1 changes to "high", analog electric signals of the signal components Vsig from pixels 11, 13, and 15 on the first row are output to the column output lines 105 of the respective columns. Also, when column Tr1, column Tr3, column Tr5, ADCTr1, ADCTr3, and ADCTr5 change to "high", analog electric signals from the column output lines on the first, third, and fifth columns are output to the A/D converters 106 of the respective columns.

At time t905, the pixels 102 on the first row and the A/D converters 106 are disconnected from each other, and the analog electric signals of the signal components Vsig from the pixels 102 on the second row are input to the A/D converters 106. First, Pv1, ADCTr1, ADCTr3, and ADCTr5 are changed to "low". With this operation, the A/D converters on the first, third, and fifth columns hold the voltages of the analog electric signals of the signal components Vsig from pixels 11, 13, and 15 on the first row.

Then, Pv2, ADCTr2, ADCTr4, and ADCTr6 of ADCTr1 to ADCTr6, and row Tr1, row Tr3, and row Tr5 of row Tr1 to row Tr5 are changed to "high". When row select signal Pv2 changes to "high", the analog electric signals of the reference components ΔV from pixels 21, 23, and 25 on the second row are output to the column output lines 105 on the first, third, and fifth columns.

At time t906, the pixels 102 on the second row and the A/D converters 106 are disconnected from each other, and the readout operation of the analog electric signals of the signal components Vsig from the pixels on the first and second rows, which are held in the A/D converters 106, starts. First, Pv2, ADCTr2, ADCTr4, ADCTr6, row Tr1, row Tr3, and row Tr5 are changed to "low". With this control operation, the A/D converters on the second, fourth, and sixth columns hold the voltages of the analog electric signals of the signal components Vsig from pixels 21, 23, and 25 on the second row.

Then, ADC SIG is changed to "high" to start the readout operation of analog electric signals of signal components from the pixels on the first and second rows upon the operation at time t72 in FIG. 6.

At time t907, the readout operation of the analog electric signals of the signal components Vsig from the pixels on the first and second rows ends, and the readout operation of the reference components ΔV on the third row is performed.

ADC SIG is changed to "low" to end the reference component readout operation of the A/D converters 106. When row select signal Pv3 is changed to "high", and, as in time t901, when column Tr1, column Tr3, column Tr5, ADCTr1, ADCTr3, and ADCTr5 are changed to "high" to change row select signal Pv3 to "high", the analog electric signals of the signal components from pixels 31, 33, and 35 on the third row are output to the column output lines 105 of the respective columns.

Also, when column Tr1, column Tr3, column Tr5, ADCTr1, ADCTr3, and ADCTr5 change to "high", the analog electric signals from the column output lines of the respective columns are output to the A/D converters 106 of the respective columns.

Subsequently, the readout operation of reference components and signal components is performed, as in those on the first and second rows.

The case wherein pixel signals are added using the adding buffer 111 will be described below. In this embodiment, as an example of the adding buffer 111, a three-column adding buffer which uses a charge averaging circuit is employed. Note that the charge averaging circuit introduced herein is merely an example, and may adopt another configuration, including a charge adding circuit which adds charges.

Figure 10:
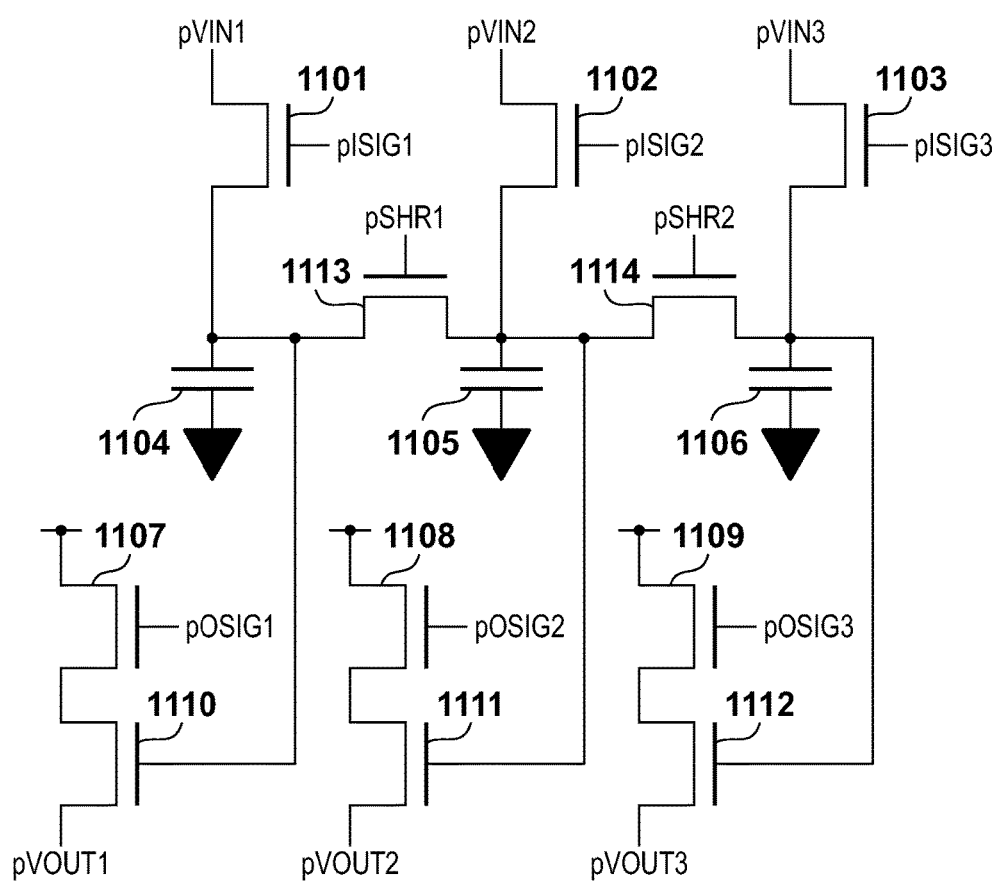
FIG. 10 is a circuit diagram for explaining an adding buffer.

The configuration of the adding buffer will be described below. FIG. 10 shows the configuration of the adding buffer. Analog electric signals from column output lines are input via input lines pVIN1 to pVIN3. Also, analog electric signals are output via output lines pVOUT1 to pVOUT3.

Input transistors 1101 to 1103 are controlled in accordance with control signals pISIG1 to pISIG3, while output transistors 1107 to 1109 are controlled in accordance with control signals pOSIG1 to pOSIG3. Also, adding source followers (to be simply referred to as adding SFs hereinafter) 1110 to 1112 convert gate charge signals into analog electric signals and output them when control signals pOSIG from output transistors connected in series with them are "high".

Adding transistors 1113 and 1114 are controlled in accordance with control signals pSHR1 and pSHR2, and the charges in capacitances 1104 to 1106 at the two terminals are averaged when these adding transistors are connected. In the adding buffer shown in FIG. 10, the charges stored in the capacitances 1104 and 1105 are averaged when the control signal pSHR1 is "high", while the charges stored in the capacitances 1104 to 1106 are averaged to generate an addition signal when the control signals pSHR1 and pSHR2 are "high".

A three-pixel averaging operation will be described below with reference to FIG. 11. Analog electric signals from column output lines are input to the input lines pVIN1 to pVIN3, and the control signals pISIG1 to pISIG3 are changed to "high" at time t1201. Then, analog electric signals from column output lines corresponding to the capacitances 1104 to 1106 are input.

At time t1202, the control signals pISIG1 to pISIG3 are changed to "low". With this operation, the analog electric signals from the column output lines are held. At time t1203, the control signals pSHR1 and pSHR2 are changed to "high". With this operation, the charges in the capacitances 1104 to 1106 are added. Upon the addition operation, the voltages of all added capacitances C1104 to C1106 become constant, as shown in FIG. 11. Also, by changing the capacitance values of the capacitances 1104 to 1106, the charge to be stored can be changed to calculate the weighted sum for each column.

At time t1204, the control signals pSHR1 and pSHR2 are changed to "low" to end the pixel addition operation.

An output transistor on the column to which the addition result is output is turned on. Note that to output the addition result to the column of the output line pVOUT1, the control signal pOSIG1 is changed to "high" at time t1205. After the output operation to the ADC ends, the control signal pOSIG1 is changed to "low" at time t1206.

In this embodiment, in pixel addition driving of the image sensor, pixel signals on a plurality of rows are simultaneously A/D converted. With this operation, as the amount of addition increases, the count of A/D conversion of one frame can be decreased to shorten the time for A/D conversion. Also, in the following embodiments, pixel signals to be input to and added by the adding buffer are desirably output from pixels of the same color.

The overview of an operation according to this embodiment will be described below with reference to FIGS. 12A and 12B. A two-pixel addition operation will be described with reference to FIG. 12A. Note that signals on (first column+second column), (third column+fourth column), and (fifth column+sixth column) are added and read out.

Figure 2:
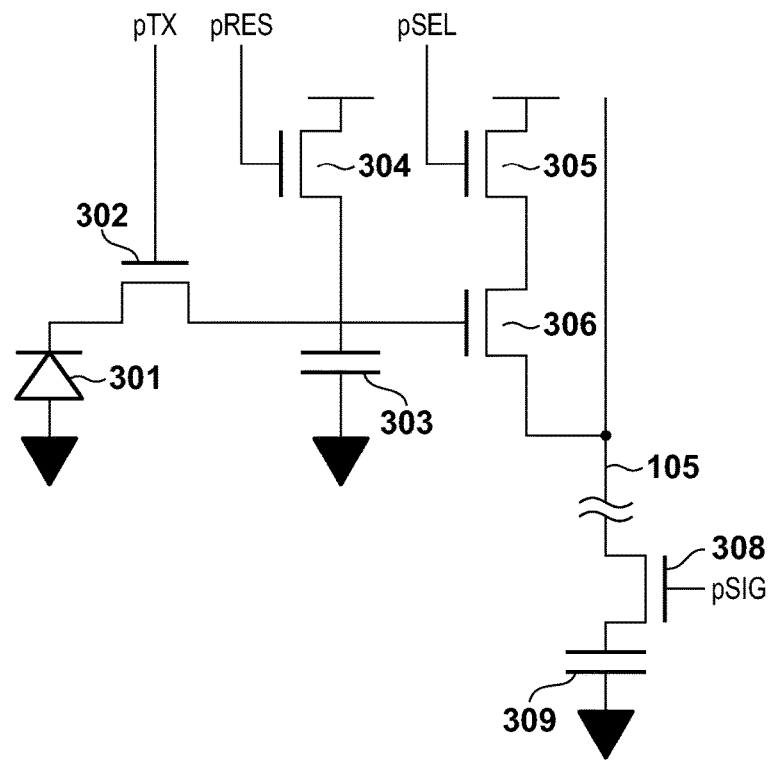
FIG. 2 is a circuit diagram showing the configuration of a pixel.
Figure 12A:
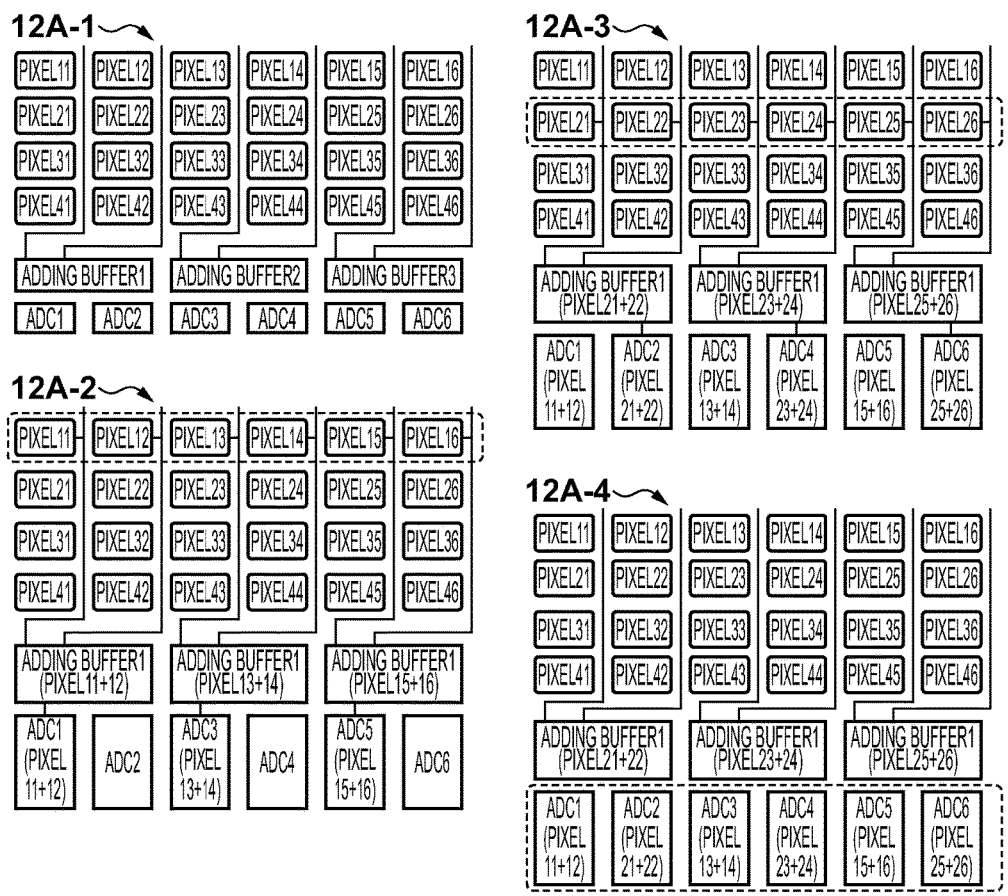

First, referring to FIG. 12A-2, pixel signals from the respective columns on the first row are added for each set of two columns by the adding buffer, and transferred to the A/D converters on the first, third, and fifth columns. Referring to FIG. 12A-3, pixel signals from the respective columns on the second row are added for each set of two columns by the adding buffer, and transferred to the A/D converters on the second, fourth, and sixth columns. Referring to FIG. 12A-4, the readout operation of the A/D converters starts.

With one readout operation mentioned above, signals corresponding to two rows obtained by two-pixel addition can simultaneously be A/D converted.

Also, with a three-pixel addition operation explained in FIG. 12B, signals corresponding to three rows can simultaneously be A/D converted. Operations other than the averaging operation of the adding buffer are the same as in column thinning readout driving, and a description thereof will not be given.

Second Embodiment

Figure 13:
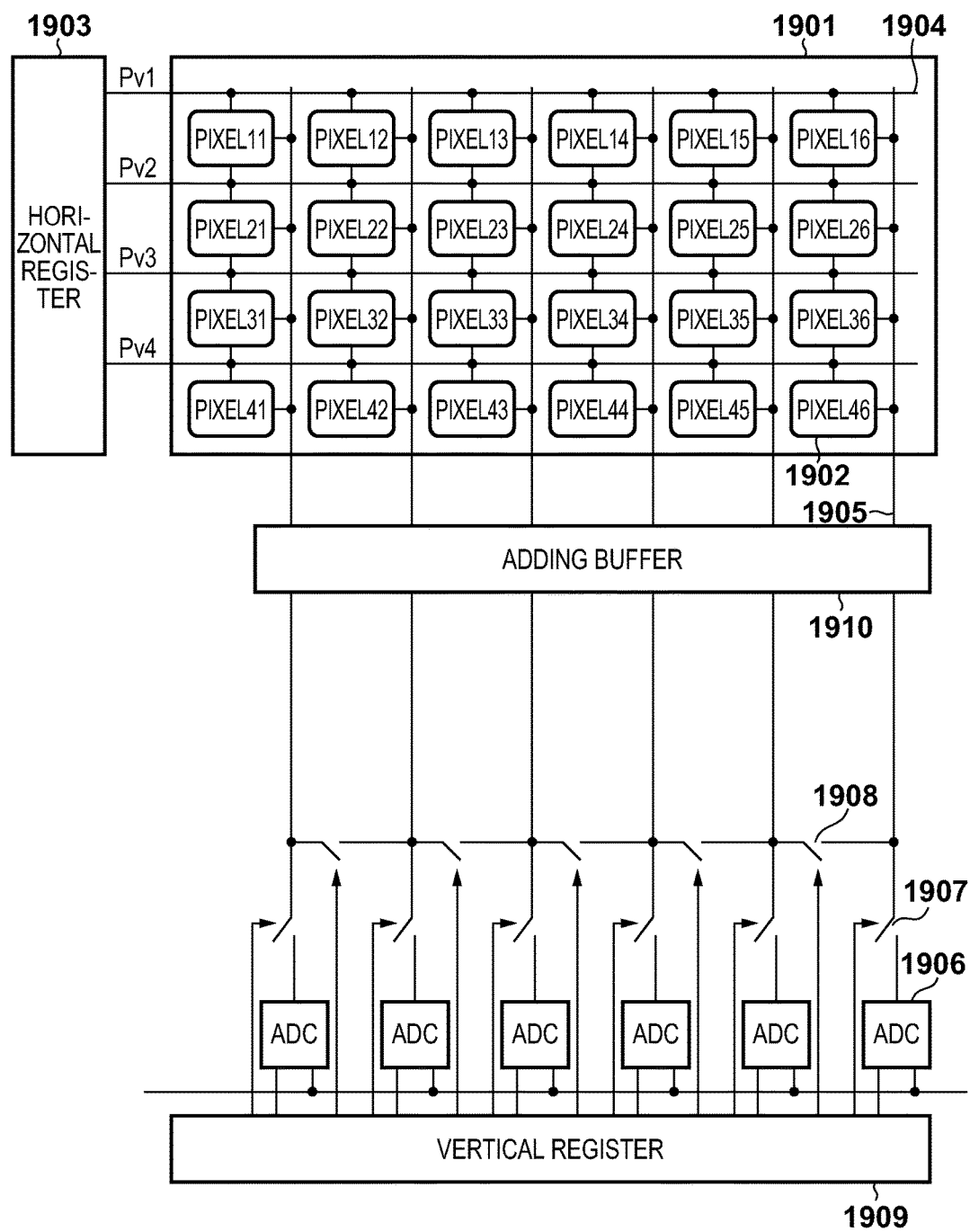
FIG. 13 is a circuit diagram showing a solid-state image sensor according to the second embodiment of the present invention.

FIG. 13 is a circuit diagram showing a solid-state image sensor according to the second embodiment of the present invention. The circuit diagram in the second embodiment is the same as in FIG. 1, except that the column transistors 107 are omitted. In this embodiment, in pixel thinning driving or pixel addition driving of the image sensor, pixel signals on an arbitrary row are A/D converted using a plurality of A/D converters. With this arrangement, as the amount of thinning increases, the number of A/D converters that can be used for one pixel readout can be increased to shorten the time for A/D conversion. Also, as the amount of addition increases, the number of A/D converters that can be used for signal readout after addition can be increased to shorten the time for A/D conversion.

The overview of an operation according to this embodiment will be described below with reference to FIGS. 14A and 14B. A ½ thinning operation will be described with reference to FIG. 14A.

As shown in FIG. 14A-1, in this case, pixel signals from the first, third, and fifth columns are read out, and those from the second, fourth, and sixth columns are thinned out. First, referring to FIG. 14A-2, pixel signals on the first, third, and fifth columns on the first row are A/D converted by A/D converters on the first and second columns, the third and fourth columns, and the fifth and sixth columns, respectively, to start the readout operation of the A/D converters in FIG. 14A-3. With the above-mentioned operation, two A/D converters can be used for each pixel.

Also, with a ⅓ thinning operation similarly explained in FIG. 14B, three A/D converters can be used for each pixel.

Figure 15:
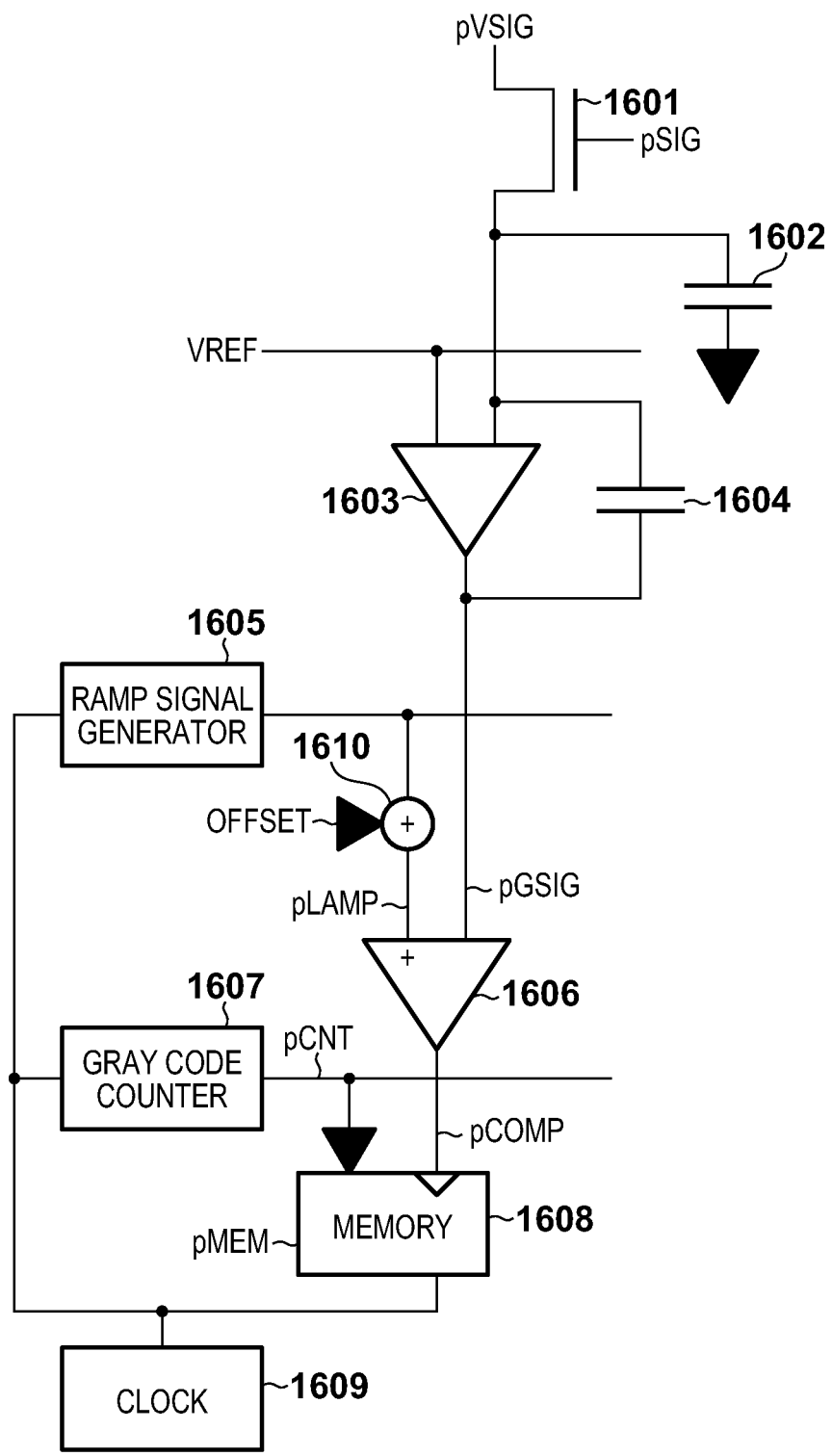
FIG. 15 is a circuit diagram showing the configuration of an A/D converter in the second embodiment.

In this embodiment, in reading out pixel signals by thinning readout, analog electric signals of the same reference components/signal components are input to a plurality of A/D converters 1406, and A/D converted. FIG. 15 is a circuit diagram showing the A/D converter. The A/D converter shown in FIG. 15 has the same configuration as in FIG. 4, except that a DC voltage adding circuit 1610 is added. The DC voltage adding circuit 1610 can switch the input/non-input of the determined DC voltage at an arbitrary timing.

The operation of the A/D converter 1406 shown in FIG. 15 will be described below with reference to timing charts shown in FIGS. 16A and 16B. Note that the operation of inputting an analog electric signal from a pixel 1402 to the A/D converter 1406, and the mechanism of A/D conversion by the A/D converter are the same as in the first embodiment, and a description thereof will not be given. As an example, upon defining two A/D converters as A/D converters a and b, an operation which uses A/D converter a, and that which uses A/D converter b will be described with reference to FIGS. 16A and 16B, respectively.

A/D conversion of a reference component ΔV will be described first. Referring to FIGS. 16A and 16B, at time t1701, the reference component ΔV is input from the pixel 1402. At times t1702 to t1704, a reference voltage RAMP is changed by a predetermined amount for each unit time. During this operation, the reference voltage RAMP and the analog electric signal of the reference component ΔV are compared, and time t1703 at which their voltages become equal is measured. Note that the product of the amount of change in reference voltage RAMP per unit time, and times t1702 to t1703 is converted into digital data as the reference component ΔV.

A/D conversion of a signal component Vsig will be described next. At time t1705, the signal component Vsig is input from the pixel 1402. At time t1706, the voltage of a DC voltage adding circuit is added and input to a reference voltage RAMP2 serving as the input voltage to A/D converter b.

When the range of the voltage that can be converted by A/D conversion is defined as an input voltage range, the input voltage range is divided into upper and lower parts by A/D converters a and b to read out the upper part by A/D converter a and read out the lower part by A/D converter b. More specifically, A/D converter b adds the DC voltage of the DC voltage adding circuit to the reference voltage RAMP2 to compare signals from a reference signal offset voltage different from that of A/D converter a.

At times t1707 to t1709, reference voltages RAMP1 and RAMP2 are changed by a predetermined amount for each unit time. During this operation, the reference voltages RAMP1 and RAMP2, and the analog electric signal of the signal component Vsig are compared, and time t1708 at which the voltages of either of A/D converters a and b become equal is measured. Note that the product of the amount of change in reference voltage RAMP1 or RAMP2 per unit time, and times t1707 to t1708 is converted into digital data as the signal component Vsig. The difference between the second readout result (Vsig+ΔV) and the first readout result (ΔV) obtained at this time is output as a pixel signal value.

After the end of the A/D conversion operation, at time t1710, the input of the DC voltage of the DC voltage adding circuit to the reference voltage RAMP2 is stopped to make the reference voltages RAMP1 and RAMP2 equal to each other.

A driving method of ½ thinning readout in the row direction when the image sensor shown in FIG. 13 is used will be described below. In the conventional image sensor, the A/D converter of each column on which the pixel 1402 is present A/D converts a signal from the pixel 1402. Therefore, as the amount of thinning in the row direction increases, the number of A/D converters that are not used to read out pixel signals increases. However, in this embodiment, in column thinning readout driving, the A/D converter 1406 on the thinning column is also used for readout. This makes it possible to increase the number of rows on which A/D conversion is performed at once (simultaneously) in accordance with the amount of column thinning.

A detailed operation in ½ thinning readout driving in the row direction will be described below with reference to FIG. 17. First, analog electric signals of reference components ΔV from the pixels 1402 on the first row are input to the A/D converters 1406. At time t1801, row select signal Pv1, ADCTr1 to ADCTr6, and row Tr1, row Tr3, and row Tr5 of row Tr1 to row Tr5 change to "high". When row select signal Pv1 changes to "high", analog electric signals of reference components ΔV of pixels 11, 13, and 15 on the first row are output to column output lines 1405 of the respective columns. Also, when ADCTr1 to ADCTr6, row Tr1, row Tr3, and row Tr5 change to "high", an analog electric signal from a column output line on the column of pixels from which pixel signals are read out is output to the A/D converter 1406 on the column of the readout pixels, and the column connected to the column of the readout pixels by the row transistor.

At time t1802, the pixels 1402 on the first row and the A/D converters 1406 are disconnected from each other, and the readout operation of analog electric signals of reference components ΔV from the pixels on the first row, which are held in the A/D converters 1406, starts. First, Pv1 and ADCTr1 to ADCTr6 are changed to low. With this control operation, the A/D converters on the first and second columns hold the voltage of the analog electric signal of the reference component ΔV from pixel 11.

Similarly, the A/D converters on the third and fourth columns hold the voltage of the analog electric signal of the reference component ΔV from pixel 13, and the A/D converters on the fifth and sixth columns hold the voltage of the analog electric signal of the reference component ΔV from pixel 15. Then, ADC RES is changed to "high" to start the readout operation of analog electric signals of reference components ΔV from the pixels on the first row upon the operation at time t1702 in FIGS. 16A and 16B.

At time t1803, the readout operation of analog electric signals of reference components ΔV from the pixels on the first row ends, and the readout operation of the signal components Vsig is performed. First, ADC RES is changed to "low" to end the reference component readout operation of the A/D converters 1406.

As in time t1801, row select signal Pv1 and ADCTr1 to ADCTr6 are changed to "high". When row select signal Pv1 changes to "high", analog electric signals of signal components Vsig from pixels 11, 13, and 15 on the first row are output to the column output line 105 of each column. Also, when ADCTr1 to ADCTr6 change to "high", an analog electric signal from the column output line of each column is output to the A/D converter 1406 on this column.

At time t1804, the pixels 1402 on the first row and the A/D converters 1406 are disconnected from each other, and a DC voltage is added to the reference voltage RAMP of the A/D converter. First, Pv1 and ADCTr1 to ADCTr6 are changed to "low". With this control operation, the A/D converters on the first to sixth columns hold the voltages of the analog electric signals of the signal components Vsig from pixels 11, 13, and 15. Then, ADC OFFSET is changed to "high" to add a desired voltage to the reference voltage RAMP for each A/D converter upon the operation at time t1706 in FIGS. 16A and 16B.

At time t1805, the readout operation of analog electric signals of signal components Vsig from the pixels on the first row, which are held in the A/D converters 1406, starts. ADC SIG is changed to "high" to start the readout operation of analog electric signals of signal components Vsig from the pixels on the first row upon the operation at time t1707 in FIGS. 16A and 16B. At time t1806, the readout operation of analog electric signals of signal components Vsig from the pixels on the first row ends. ADC SIG is changed to "low" to end the signal component readout operation of the A/D converters 1406.

At time t1807, the input of a DC voltage added to the reference voltage RAMP of the A/D converter is stopped, and reference components ΔV of the pixels 1402 on the second row are input to the A/D converters 1406. At time t1807, ADC OFFSET is changed to "low" to input the DC voltage added to the reference voltage RAMP of each A/D converter upon the operation at time t1710 in FIGS. 16A and 16B.

Row select signal Pv2, ADCTr1 to ADCTr6, row Tr1, row Tr3, and row Tr5 are changed to "high". When row select signal Pv2 changes to "high", analog electric signals of reference components ΔV from pixels 11, 13, and 15 on the second row are output to the column output lines 1405 of the respective columns. Also, when ADCTr1 to ADCTr6, row Tr1, row Tr3, and row Tr5 change to "high", an analog electric signal from a column output line on the column of pixels from which pixel signals are read out is output to the A/D converter 1406 on the column of the readout pixels, and the column connected to the column of the readout pixels by the row transistor.

Subsequently, the readout operation of reference components and signal components is performed, as in that on the first row.

The case wherein pixel signals are added by an adding buffer 1910 will be described below with reference to FIGS. 18A and 18B. A two-pixel addition operation will be described with reference to FIG. 18A. Note that signals on (first column+second column), (third column+fourth column), and (fifth column+sixth column) are added and read out.

Figure 3:
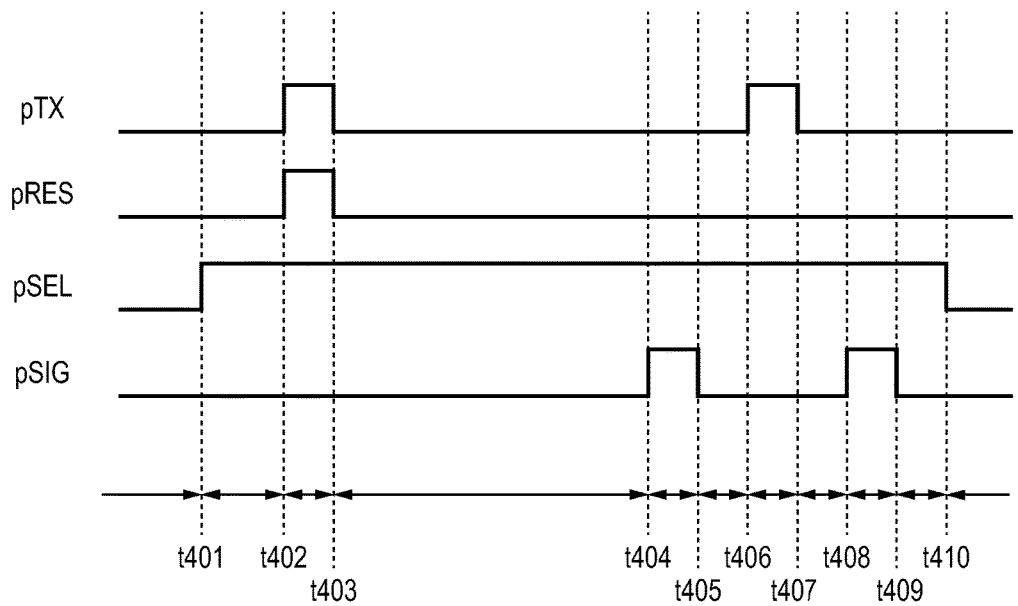
FIG. 3 is a timing chart of driving of the pixel.
Figure 18A:
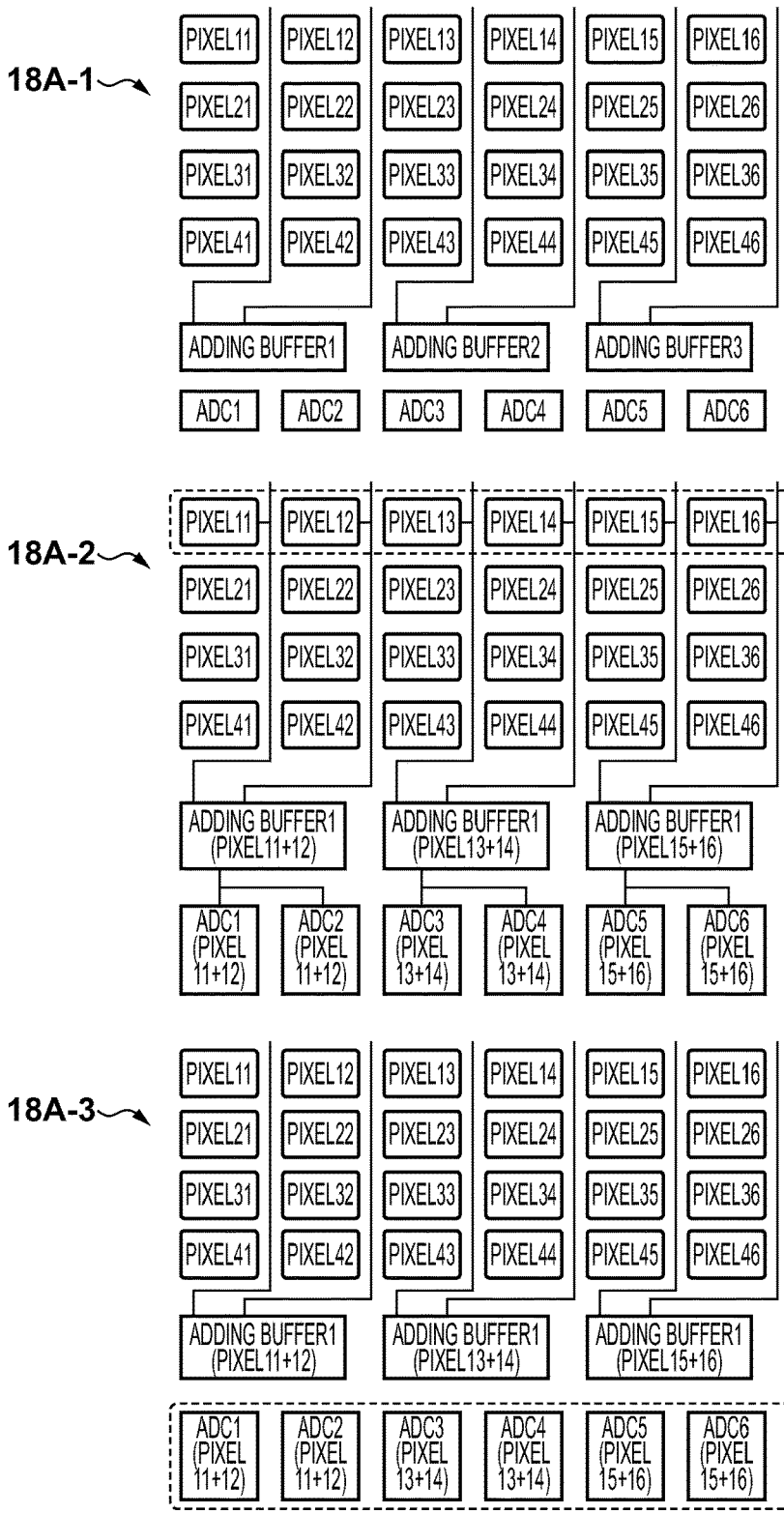

First, referring to FIG. 18A-2, pixel signals obtained by addition for each set of two columns on the first row are input to the A/D converters on the first and second columns, the third and fourth columns, and the fifth and sixth columns, respectively, to start the readout operation of the A/D converters in FIG. 18A-3.

With the above-mentioned operation, two A/D converters can be used for each pixel. Also, with a three-pixel addition operation similarly explained in FIG. 18B, three A/D converters can be used for each signal after addition. Operations other than the averaging operation of the adding buffer are the same as in column thinning readout driving, and a description thereof will not be given.

Third Embodiment

Figure 19:
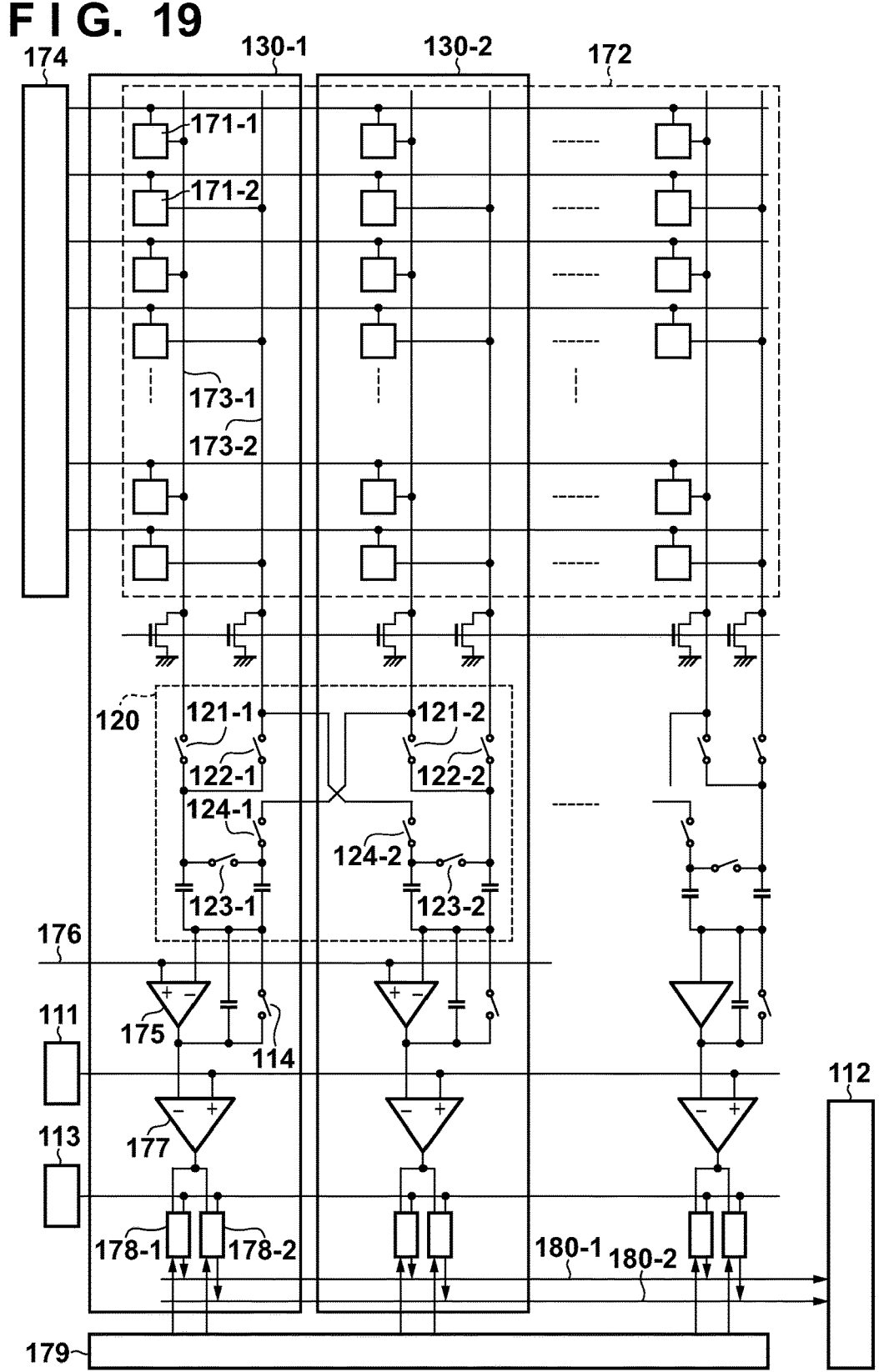
FIG. 19 is a circuit diagram showing a solid-state image sensor according to the third embodiment of the present invention.

The third embodiment of the present invention will be described below. FIG. 19 is a circuit diagram showing a solid-state image sensor according to the third embodiment. Pixels 171-1 and 171-2 output signals based on incident light by photoelectric conversion, and N (rows)×M (columns) pixels 171 are arranged in an image sensing unit 172. Column output lines 173-1 and 173-2 output pixel outputs on a row, selected by a row selection unit 174, for each column. The solid-state image sensor according to this embodiment includes two column output lines 173-1 and 173-2 for each pixel column, and pixels on every other row on the same pixel column are alternately connected to the column output lines 173-1 and 173-2. In this embodiment, the pixel 171-1 is connected to the column output line 173-1, and the pixel 171-2 is connected to the column output line 173-2.

A column amplifier 175 receives a signal from a column output line 173, and amplifies and outputs it to an A/D conversion circuit 177 provided for each column. A column amplification reference voltage 176 is supplied to the column amplifier of each column. A clamp SW 114 clamps a signal.

A ramp signal generation circuit 111 generates a ramp signal. Also, latch memory circuits 178-1 and 178-2 can temporarily store and read out the A/D conversion results to digital output lines 180-1 and 180-2. A column selection circuit 179 sequentially selects the latch memory circuits, and sequentially transfers digital signals to a digital output line 110.

The memory 178-1 and an output line 110-1 for an S signal store and output an S signal, while the memory 178-2 and an output line 110-2 for an N signal store and output an N signal. Also, each of pixel columns 130-1 and 130-2 indicates one pixel column unit, and two column output lines, one column amplifier, and one column A/D conversion circuit are used for one pixel column in this embodiment. Also, a gray code counter 113 counts the gray code, and a digital processing circuit 112 performs digital processing.

An adding circuit 120 can add pixel signals output from the pixel columns 130-1 and 130-2. The adding circuit 120 is formed by a plurality of switches and a plurality of capacitances. By ON/OFF control of switches 121-1, 121-2, 122-1, 122-2, 123-1, 123-2, 124-1, and 124-2, it can be switched whether a pixel signal output to the column output line 173-1 is read out, a pixel signal output to the column output line 173-2 is read out, or a pixel signal output to the column output line 173-1 or 173-2 is added to that output to the column output line 173-1 or 173-2 on an adjacent pixel column.

A feature of this embodiment lies in that the image sensor includes an A/D conversion circuit 177 provided to each column, an adding circuit 120 which adds signals from a plurality of pixel columns, and a switch which inputs the added pixel signal to an arbitrary A/D conversion circuit in accordance with the image capture conditions.

The A/D conversion circuit 177 is configured with a differential input comparator: it receives a signal output from the column amplifier 175 at its positive input terminal, and receives the output from the ramp signal generation circuit 111 at its negative input terminal. The comparator 177 outputs high level if the voltage of the positive input terminal is higher than that of the negative input terminal, while it outputs low level if the voltage of the positive input terminal is higher than that of the negative input terminal.

The latch memory circuits 178-1 and 178-2 latch and store the count value of the gray code counter 113 at the comparator inversion timing. In this embodiment, the output from the gray code counter 113 when the output from the comparator 177 changes from "high" to "low" is held.

FIG. 20 is a circuit diagram illustrating an example of the circuit configuration of the pixel 171 shown in FIG. 19. A photodiode 152 generates a charge corresponding to incident light by photoelectric conversion. A transfer transistor 153 has its source electrically connected to the photodiode 152, its gate electrically connected to a transfer control line 162, and its drain electrically connected to a floating diffusion (to be abbreviated as FD hereinafter) region 154.

The FD region 154 temporarily holds the charge transferred from the photodiode 152 via the transfer transistor 153. A reset transistor 155 has its source electrically connected to the FD region 154, its gate electrically connected to a reset control line 161, and its drain electrically connected to the power supply voltage. An amplifier transistor 156 has its gate which serves as a control electrode and is electrically connected to the FD region 154, its drain electrically connected to the power supply voltage, and its source electrically connected to the select transistor 157. The select transistor 157 has its gate electrically connected to the selection control line 163, its source electrically connected to the column output line 173, and its drain electrically connected to the source of the amplifier transistor 156.

The amplifier transistor 156 amplifies and outputs a signal, based on the charge held in the FD region 154, to the column output line 173 via the select transistor 157. The reset control line 161, transfer control lines 162, and selection control line 163 are electrically connected to a row select line 104.

Note that referring to FIG. 20, the column output line 173, reset control line 161, transfer control line 162, and selection control line 163 are added with suffix "-1" for the first row, and suffix "-2" for the second row, for the sake of distinction between driving on the first row and that on the second row of the row selection unit 174. However, descriptions and reference numerals for each row are omitted for elements, denoted by reference numerals 152 to 157, such as a photodiode because they operate in the same way.

Figure 21C:
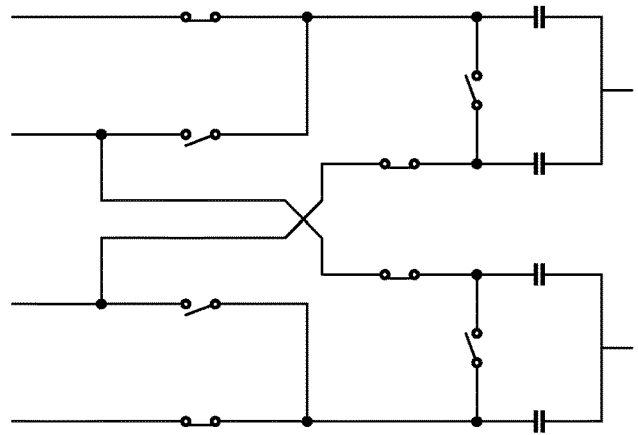
FIGS. 21A to 21C are views showing the switching states for respective modes.
Figure 21B:
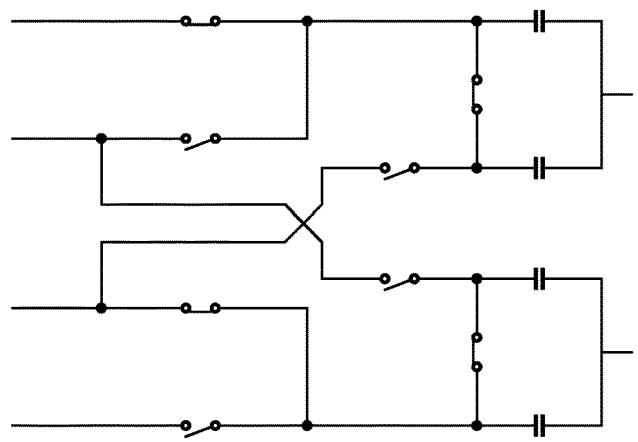
Figure 21A:
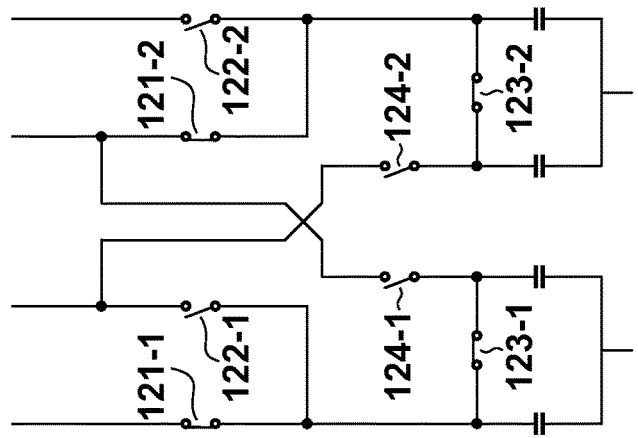

FIGS. 21A, 21B, and 21C are enlarged views of the adding circuit 120 shown in FIG. 19. Referring to FIGS. 21A to 21C, the switches 121-1, 123-1, 121-2, and 123-2 are ON, while the switches 122-1, 124-1, 122-2, and 124-2 are OFF. These switches can switch between ON and OFF under switching control, as shown in FIGS. 21B and 21C.

FIGS. 21A, 21B, and 21C show the switching states for respective modes, in which FIG. 21A shows the mode in which an image signal output to the column output line 173-1 is read out, and FIG. 21B shows the mode in which an image signal output to the column output line 173-2 is read out. Also, FIG. 21C shows the mode in which a pixel signal output to the column output line 173-1 of the pixel column 130-1 is added to that output to the column output line 173-1 of the adjacent pixel column 130-2, and the sum signal is output to the A/D converter, while a pixel signal output to the column output line 173-2 of the pixel column 130-1 is added to that output to the column output line 173-2 of the adjacent pixel column 130-2, and the sum signal is output to the A/D converter. With the modes shown in FIGS. 21A and 21B, pixel signals from the column output lines 173-1 and 173-2 can simultaneously be read out to allow high-speed readout.

Although pixel signals from two adjacent columns are added in this embodiment, the present invention is not limited to this embodiment, and the same effect can also be obtained when signals from one column or those from columns separated at a distance of a plurality of columns are added. Also, the combination of addition columns, and the method of weighting in addition, for example, are not limited to this embodiment, and addition free from a color barycenter deviation, for example, is also possible.

Figures 22A, 22B:
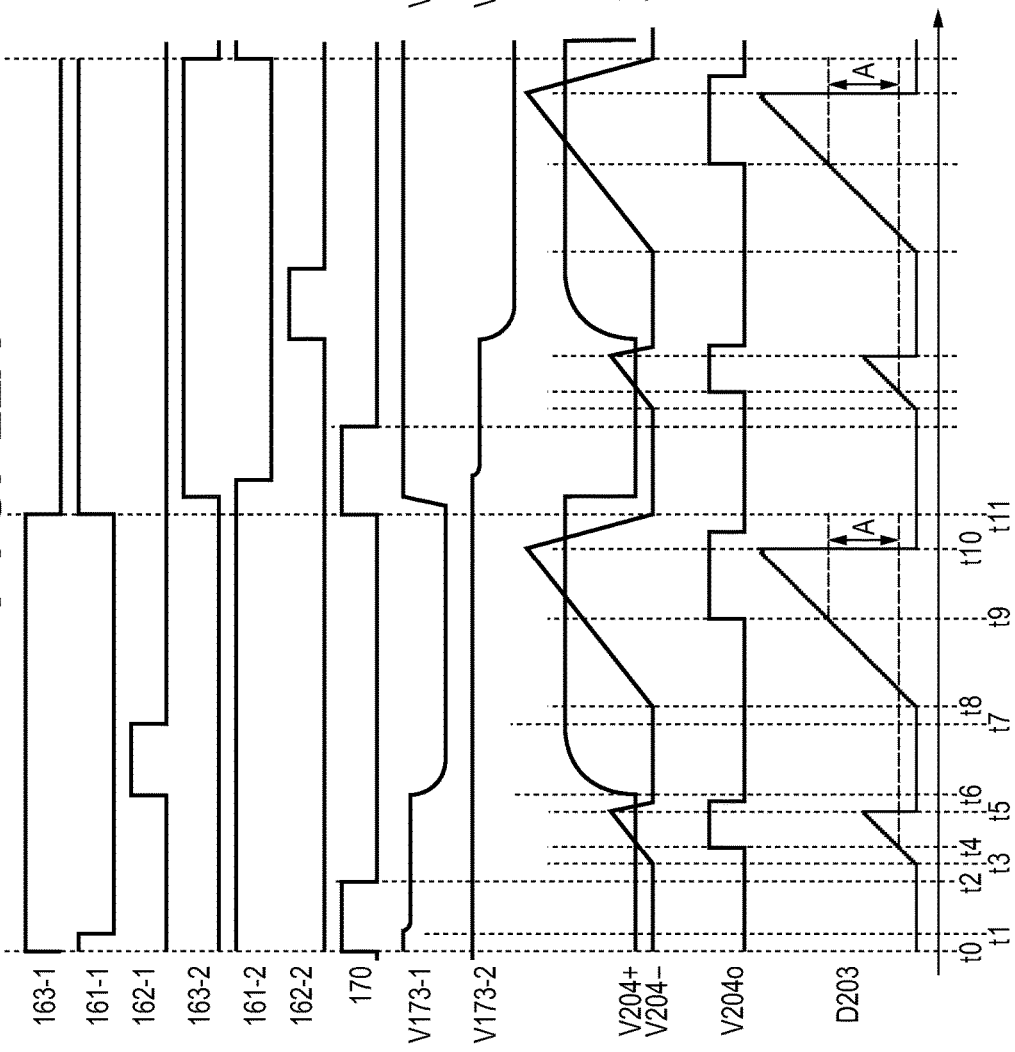
FIGS. 22A and 22B are timing charts showing a method of driving a solid-state image sensing apparatus.

FIGS. 22A and 22B are timing charts illustrating a method of driving the solid-state image sensing apparatus illustrated in FIGS. 19, 20, and 21. FIG. 22A shows the timing at which the adding circuit 120 is in the switch-connected state shown in FIGS. 21A and 21B, and FIG. 22B shows the timing at which the adding circuit 120 is in the state shown in FIG. 21C.

Referring to the timing charts illustrated in FIGS. 22A and 22B, if the control pulse has high level (to be referred to as H level hereinafter), the source-to-drain path of a MOS transistor applied with the control pulse is turned on. On the other hand, if the control pulse has low level (to be referred to as L level hereinafter), the source-to-drain path of a MOS transistor applied with the control pulse is turned off. Note that when a MOS transistor the source-to-drain path of which is turned on by applying a control pulse having L level to its gate is used, the same operation as in this embodiment can be done by reversing the H and L levels of the pulse shown in FIGS. 22A and 22B.

The operations of the circuits shown in FIGS. 19, 20, and 21A to 21C in a method of driving a solid-state image sensing apparatus according to this embodiment will be described in turn from time t0 with reference to the timing chart shown in FIG. 22A.

First, at time to, a selection control pulse output to a selection control line 163-1 on the row on which readout is to be done changes to H level, so the first row is selected as a readout row. Then, at time t1, the FD region 154 is reset by changing a reset control pulse output to the reset control line 161-1 from H level to L level. With this operation, a voltage V173 of the column output line 173-1 changes to reset level at time t1. At time t2 at which the output from the column output line has become stable, a control pulse 170 is changed to L level to perform a clamp operation.

At time t3, A/D conversion starts. Note that the switching operation relationship of the adding circuit 120 shown in FIGS. 21A to 21C is in the state shown in FIG. 21A. Therefore, the output of the column output line 173-1 is directly connected to a column amplifier and column A/D converter on the same column.

Depending on the ramp gradient, a voltage V204− drops from time t3. At the same time, a counter 202 starts its count operation to change a counter output 203. A waveform D203 indicates a value corresponding to the output value, based on the digital code of the counter 202.

At time t4, at the timing at which the voltages V204− and V204+ are inverted, the output from the comparator is inverted, and the counter value D203 at this time is held. The held value is the reset level A/D conversion result. At time t5, A/D conversion of the reset level ends, and the reference voltage RAMP changes to the initial level. At time t6, a transfer control pulse output to the reset control line 161-1 is changed to H level to transfer the charge generated by the pixel 102 to the row selection unit 174, and, at time t7, the pulse changes to L level after transfer to determine the signal level. At time t8, A/D conversion starts. As in reset level A/D conversion, at time t9, the output from the comparator is inverted, and the counter value D203 at this time is held. The difference between the held value of the reset level and that of the signal level is the A/D conversion result. This difference processing is performed by the digital processing circuit 112.

At time t10, a selection control pulse output to a selection control line 163-2 changes to H level, so the second row is selected as a readout row. Also, the control pulses output to the selection control line 163-1, the transfer control line 162-1, and a reset control line 161-1 return to L level. The operations at time t11 and subsequent times are the same except that the selected row changes, and a pixel signal is output to the column output line 173-2, and a description thereof will not be given. However, the switching operation relationship of the adding circuit 120 shown in FIGS. 21A to 21C is in the state shown in FIG. 21B. Therefore, the output of the column output line 173-1 is switched and connected to a column amplifier and column A/D converter on the same column.

The timing chart shown in FIG. 22B will be described below. First, at time t0, both selection control pulses output to the selection control lines 163-1 and 163-2 on the rows on which readout is to be done change to H level, so the first and second rows are selected as readout rows. Then, at time t1, the FD regions are reset by changing reset control pulses output to the reset control lines 161-1 and 161-2 from H level to L level. With this operation, voltages V173 of the column output lines 173-1 and 173-2 change to reset level at time t1. That is, pixel signals from two rows are simultaneously read out.

By switching control of the adding circuit 120, as shown in FIG. 21C, a pixel signal from the column output line 173-1 of the pixel column 130-1, and that from the column output line 173-1 of the adjacent pixel column 130-2 are input to the same column amplifier via a capacitance. With this operation, the pixel signal from the column output line 173-1 of the pixel column 130-1 is added to that of the column output line 173-1 of the adjacent pixel column 130-2. On an adjacent column, a pixel signal from the column output line 173-2 of the pixel column 130-1, and that from the column output line 173-2 of the adjacent pixel column 130-2 are input to the same column amplifier via a capacitance. By connecting the addition result to each column A/D converter to simultaneously perform A/D conversion, readout can be done from two rows at once to speed up readout. The operations at time t1 and subsequent times are the same as in FIG. 22A.

Note that an example in which pixels are formed by N-channel transistors will be described below. When pixels are formed by P-channel transistors as well, the present invention can be applied upon inverting the voltage polarity to the case wherein pixels are formed by N-channel transistors. Also, the A/D conversion scheme is not limited to this embodiment, and the same effect can be obtained as long as the connection between the adding circuit and the A/D converter can be changed even when A/D conversion is done using a column counter, the successive approximation scheme, or sigma-delta scheme.

Fourth Embodiment

Figure 23:
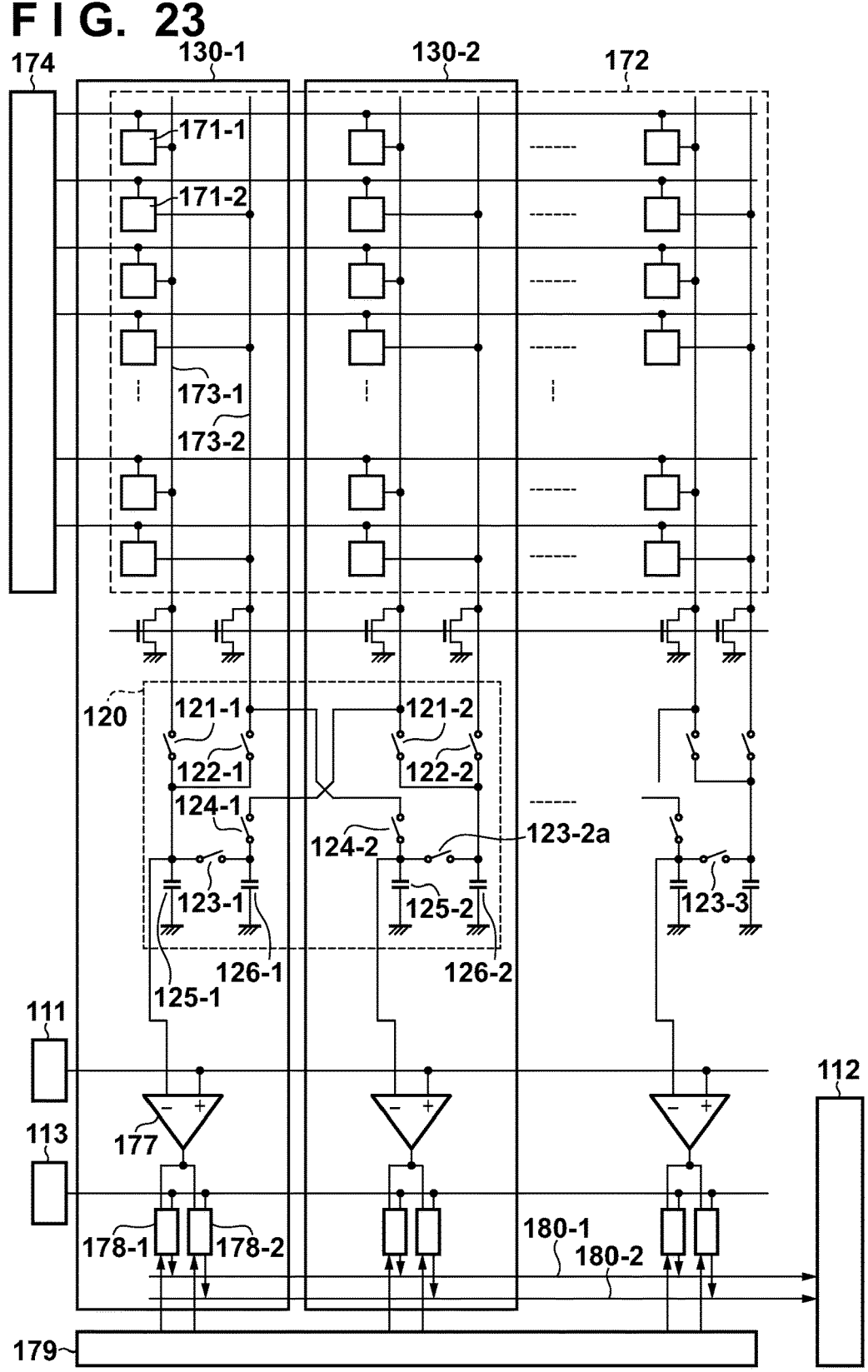
FIG. 23 is a circuit diagram showing a solid-state image sensor according to the fourth embodiment of the present invention.

FIG. 23 is a circuit diagram showing the fourth embodiment. The same reference numerals as in FIG. 19 of the third embodiment denote the same circuit components, and a description thereof will not be given. With a configuration which does not use a column amplifier in this embodiment as well, pixel signals from column output lines 173-1 and 173-2 are sampled/held using switches and capacitances, and averaged to allow averaging. A driving method in this embodiment will be described below.

Figure 24:
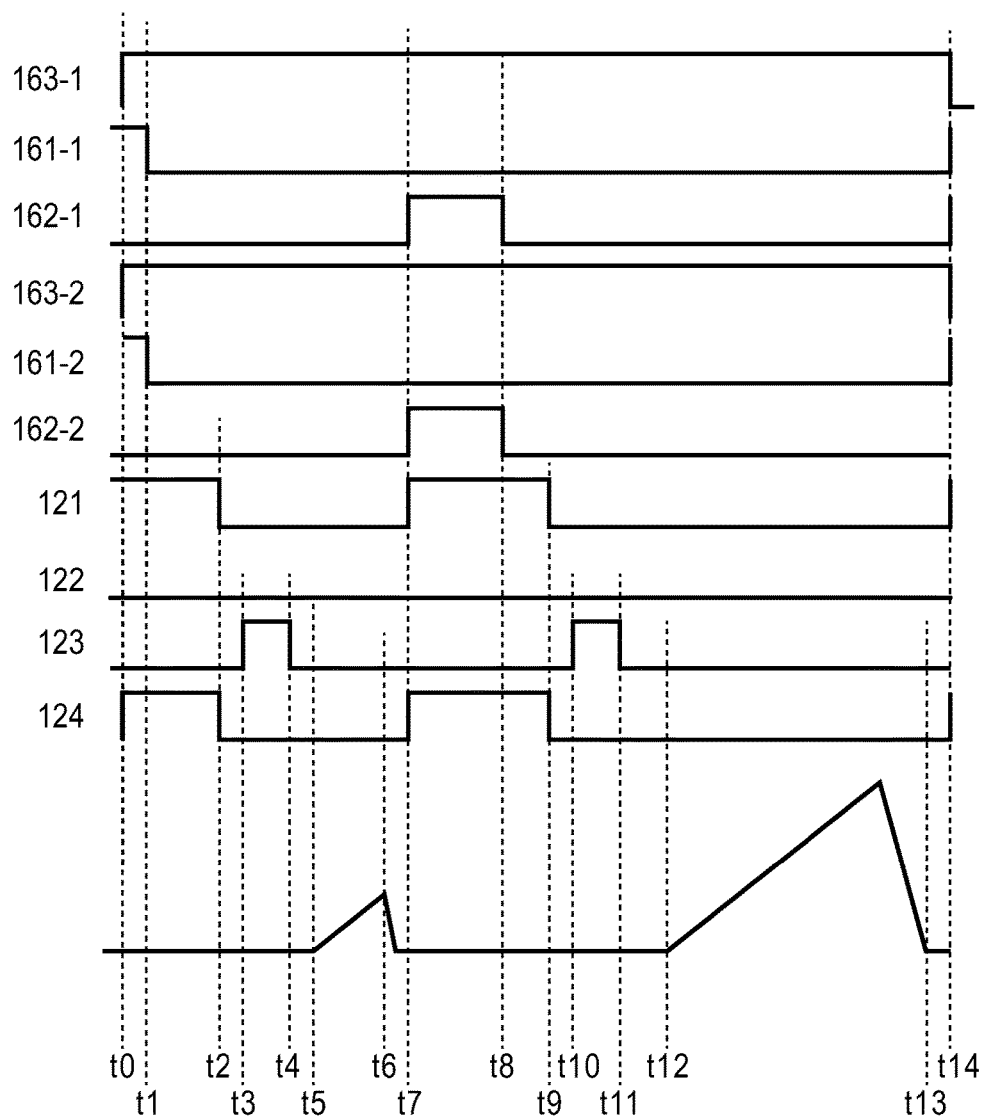
FIG. 24 is a timing chart showing a method of driving a solid-state image sensing apparatus.

Switching control when pixel signals are read out from the column output lines 173-1 and 173-2 is the same as in FIGS. 21A and 21B of the third embodiment, and a description thereof will not be given. FIG. 24 shows the driving timing when pixel signals from the column output lines 173-1 and 173-2 are added to each other, and the sum is read out. Note that switches 121-1 and 121-2, for example, operate in the same way, and a description of their timings will not be given.

First, at time t0, both selection control pulses output to selection control lines 163-1 and 163-2 on the rows on which readout is to be done change to H level, so the first and second rows are selected as readout rows. Then, at time t1, the FD regions are reset by changing reset control pulses output to reset control lines 161-1 and 161-2 from H level to L level. With this operation, voltages V173 of the column output lines 173-1 and 173-2 change to reset level at time t1. That is, pixel signals from two rows are simultaneously read out.

In this case, switches 121-1, 122-2, 124-1, and 124-2 are ON. Therefore, the voltage of the column output line 173-1 on a pixel column 130-1 is input to a capacitance 125-1, while that of the column output line 173-2 is input to a capacitance 125-2. Also, the voltage of the column output line 173-1 on a pixel column 130-2 is sampled in a capacitance 126-1, while that of the column output line 173-2 of the pixel column 130-2 is sampled in a capacitance 126-2. At time t2, switches 121 and 124 are switched from ON to OFF to sample the reset levels of the column output lines 173-1 and 173-2.

At time t3, as switches 123-1 and 123-2 are turned on, the capacitances 125-1 and 126-1 and the capacitances 125-2 and 126-2 short-circuit to average two signals. The switch 123 is turned off at time t4, and A/D conversion starts at time t5. The operations at time t6 and subsequent times are the same as in the third embodiment, and a description thereof will not be given.

At time t7, a transfer control pulse from a transfer control line is changed to H level to read out a signal, and the sampling operations of the switches 121 and 124 in this case are the same as at times t1 to t4 when a reset signal is output. In this way, by performing sample-and-hold and averaging using switches and capacitances to perform addition, and performing switching so that the obtained sum pixel signal is input to an arbitrary A/D conversion circuit, A/D conversion is simultaneously performed to speed up readout.

Fifth Embodiment

Figure 25:
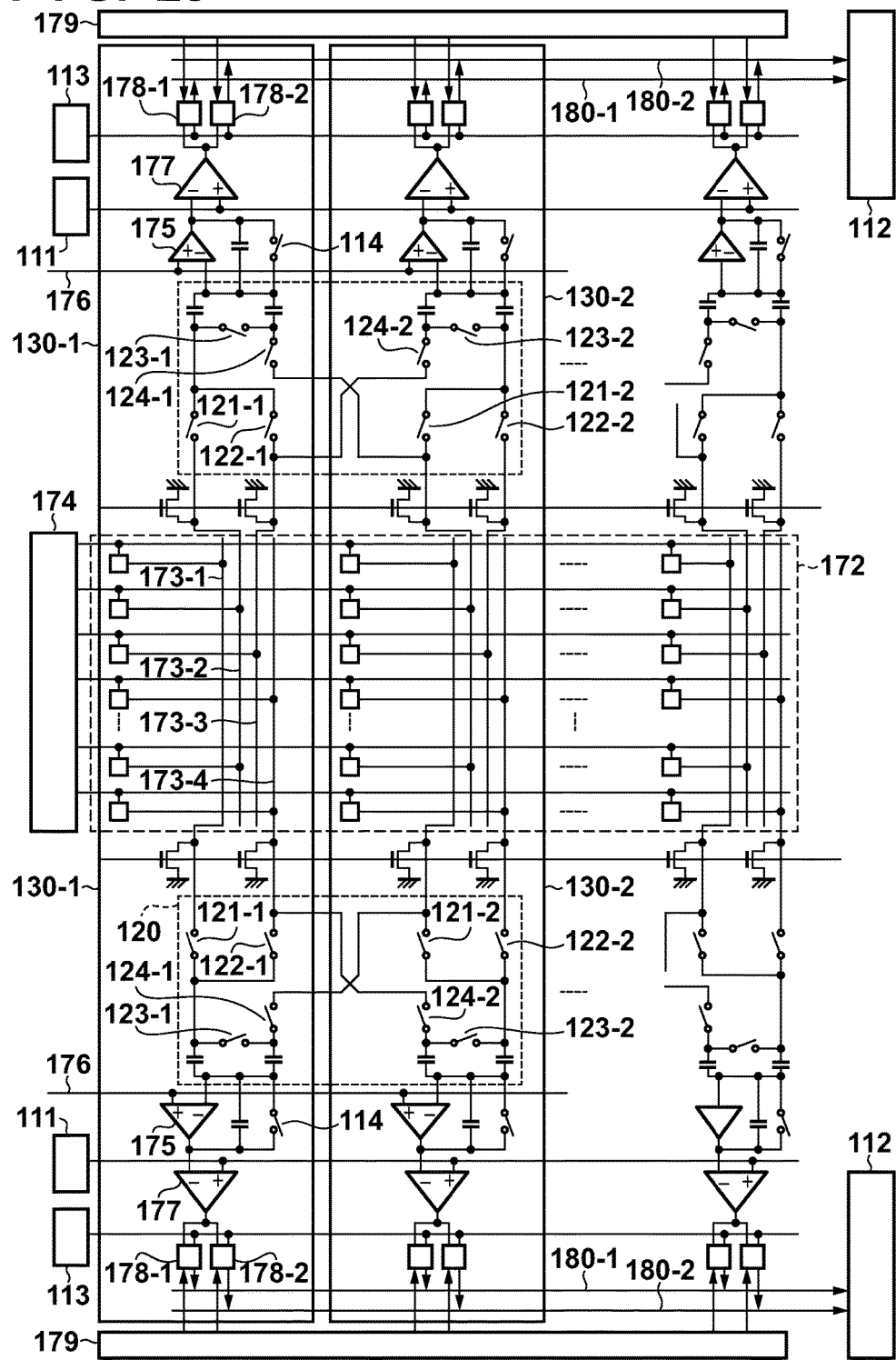
FIG. 25 is a circuit diagram showing a solid-state image sensor according to the fifth embodiment of the present invention.

FIG. 25 is a circuit diagram showing the fifth embodiment. A solid-state image sensor in this embodiment includes four column output lines 173-1, 173-2, 173-3, and 173-4 for one pixel column. In this embodiment, pixels on four rows continuous in the column direction on the same pixel column are connected to the four column output lines 173-1 to 173-4, respectively. A row selection unit 174 can simultaneously select four rows, and read out signals from them.

Therefore, in this embodiment, two, upper and lower column amplifiers, and two, upper and lower column A/D conversion circuits are provided for one pixel column, but as in, for example, the third embodiment, by performing switching so that the obtained sum pixel signal is input to an A/D conversion circuit on an arbitrary column, A/D conversion is simultaneously performed to speed up readout.

Sixth Embodiment

Figure 26:
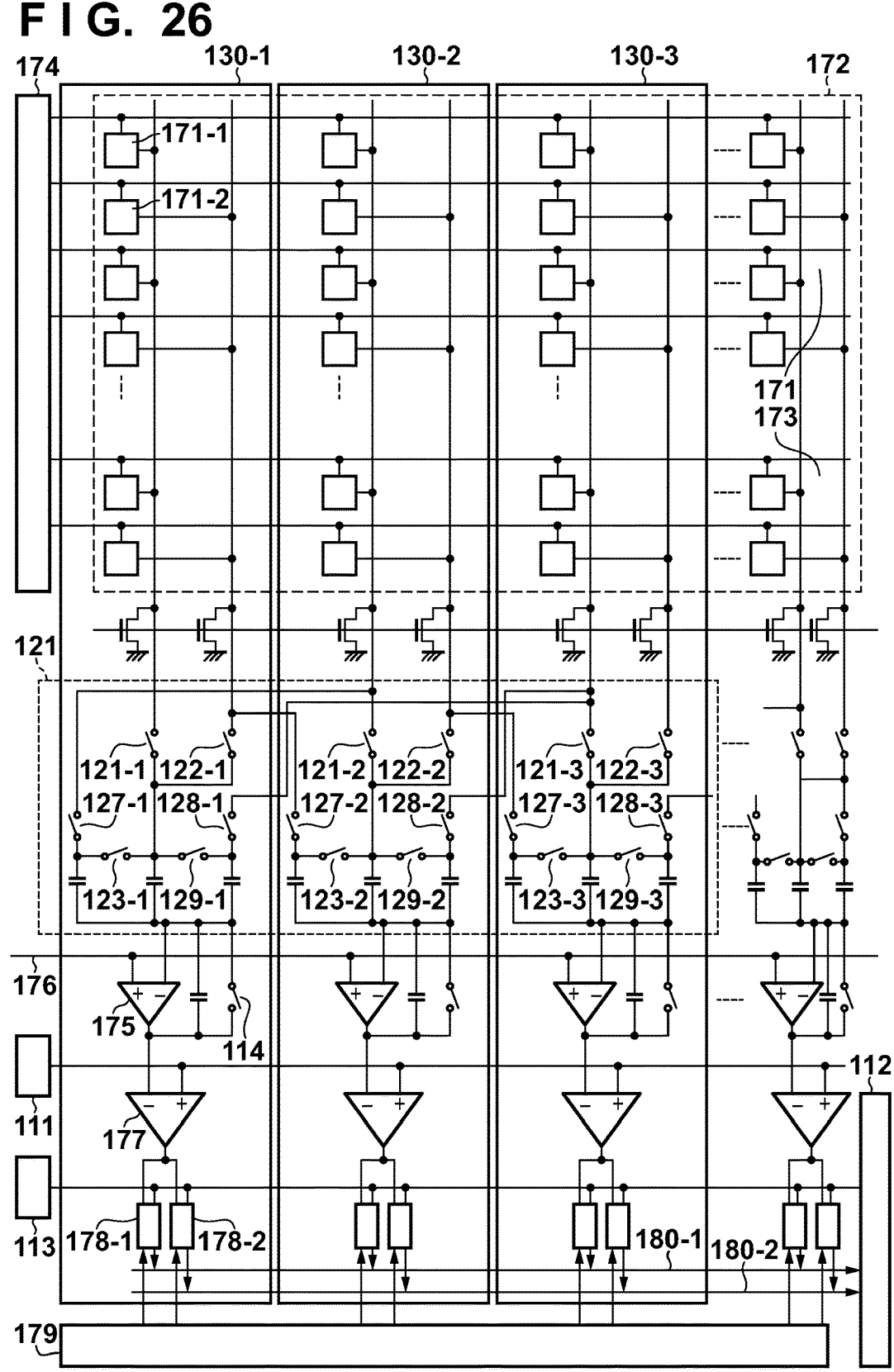
FIG. 26 is a circuit diagram showing a solid-state image sensor according to the sixth embodiment of the present invention.
Figure 27A:
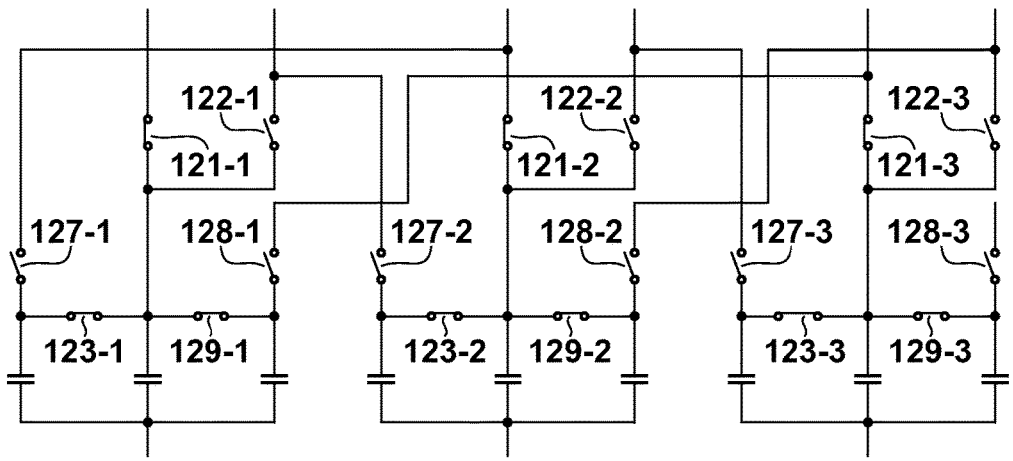
FIGS. 27A to 27C are views showing the switching states for respective modes.
Figure 27B:
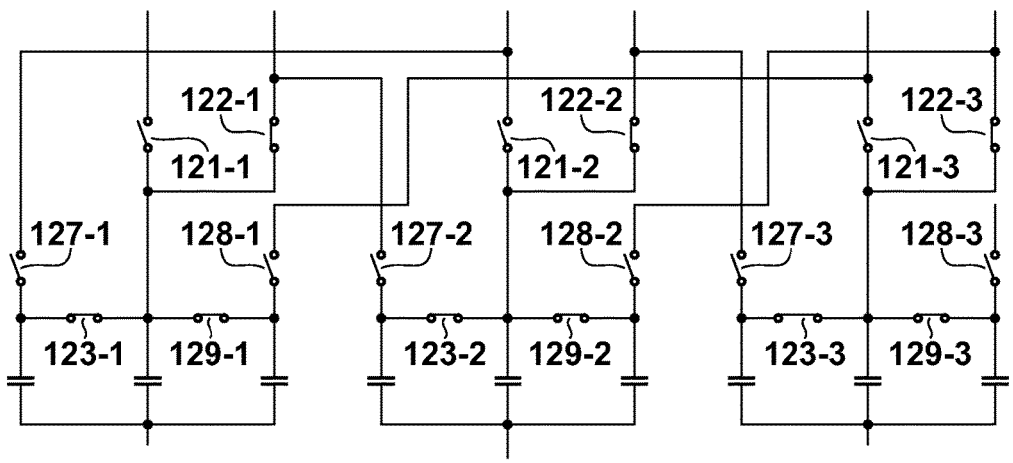
Figure 27C:
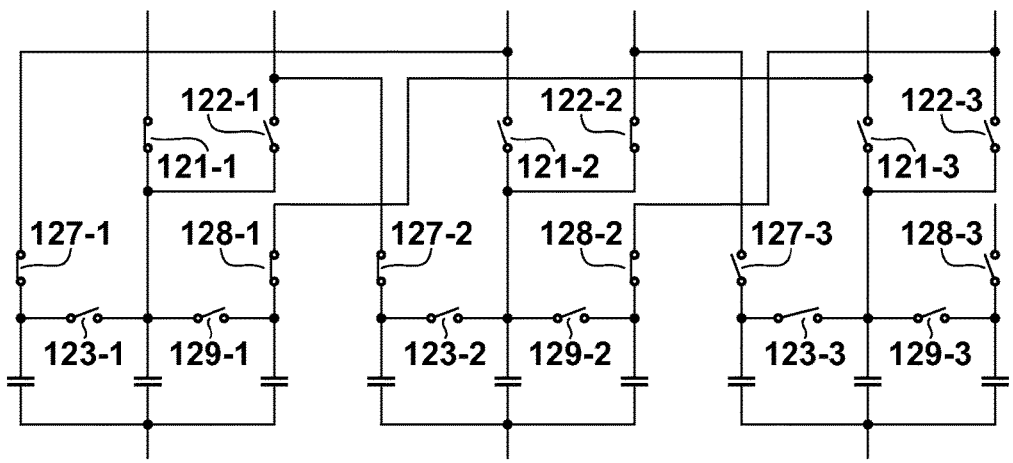

FIG. 26 is a circuit diagram showing the sixth embodiment. An adding circuit 121 in this embodiment is a three-column adding circuit, which adds pixel signals from column output lines 173-1 of three pixel columns 130-1, 130-2, and 130-3, and inputs the obtained pixel signal to a A/D conversion circuit 177 of the pixel column 130-1. Also, pixel signals from column output lines 173-2 of the three pixel columns 130-1, 130-2, and 130-3 are added, and inputs the obtained pixel signal to the A/D conversion circuit 177 of the pixel column 130-2. FIGS. 27A to 27C show the connection states of the switches of the adding circuit. As in other embodiments, by performing switching so that the obtained sum pixel signal is input to an arbitrary A/D conversion circuit, A/D conversion is simultaneously performed to speed up readout.

FIGS. 27A, 27B, and 27C show the switching states for respective modes, in which FIG. 27A shows the mode in which an image signal output to the column output line 173-1 is read out for each pixel column, and FIG. 27B shows the mode in which an image signal output to the column output line 173-2 is read out for each pixel column. Also, FIG. 27C shows the mode in which a pixel signal output to the column output line 173-1 of the pixel column 130-1 is added to those output to the column output lines 173-1 of the adjacent pixel columns 130-2 and 130-3, and the sum signal is output to the A/D converter, while a pixel signal output to the column output line 173-2 of the pixel column 130-1 is added to those output to the column output lines 173-2 of the adjacent pixel column 130-2 and 130-3, and the sum signal is output to the A/D converter. With the modes shown in FIGS. 27A and 27B, pixel signals from the column output lines 173-1 and 173-2 can simultaneously be read out to allow high-speed readout.

Although pixel signals from two adjacent columns are added in this embodiment, the present invention is not limited to this embodiment, and the same effect can also be obtained when signals from one column or those from columns separated at a distance of a plurality of columns are added. Also, the combination of addition columns, and the method of weighting in addition, for example, are not limited to this embodiment, and addition free from a color barycenter deviation, for example, is also possible.

Also, since the column A/D conversion circuit of the pixel column 130-3 is not used, power may be saved without operation. Alternatively, by further increasing the number of column output lines, speedup may be performed using A/D conversion when pixel signals are simultaneously read out from three TOWS.

Seventh Embodiment

Figure 28:
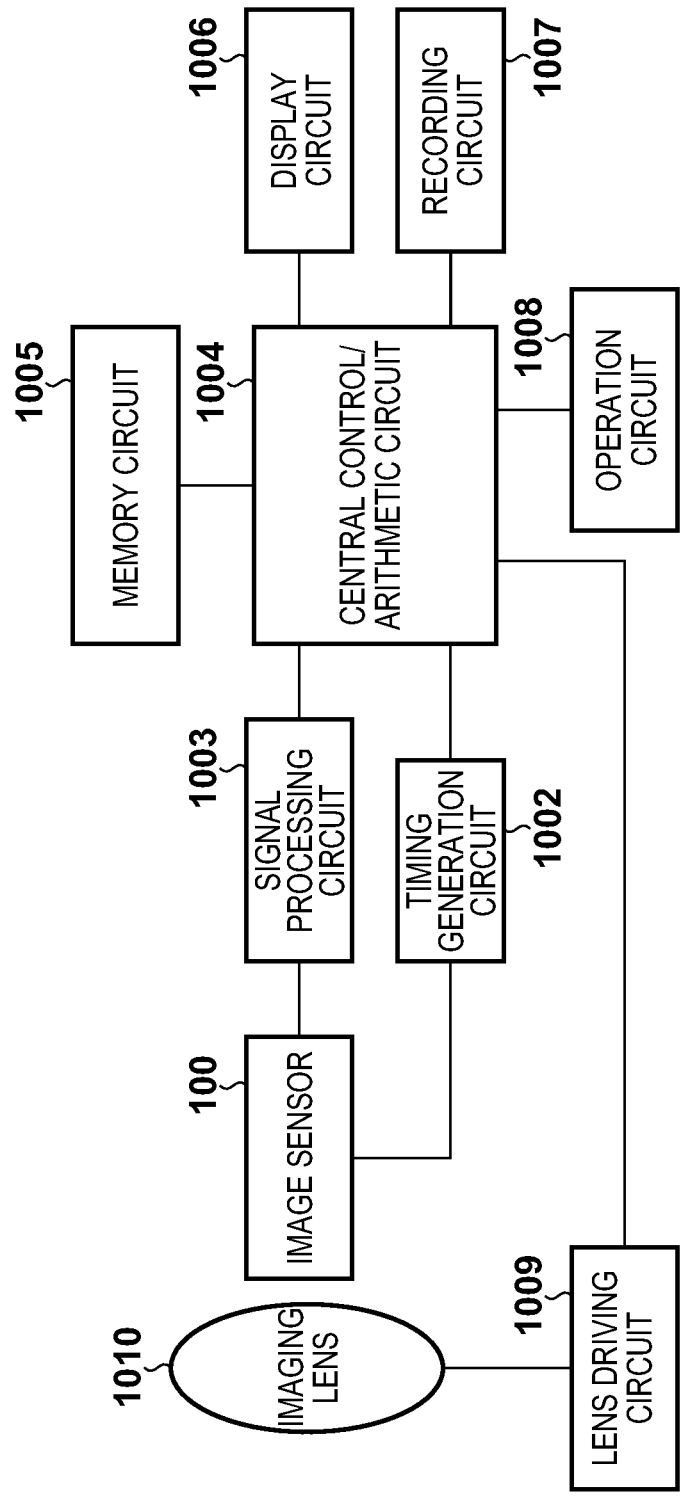
FIG. 28 is a block diagram showing an image sensing apparatus according to the seventh embodiment of the present invention.

FIG. 28 is a block diagram showing the entire configuration of an image sensing apparatus according to the seventh embodiment. An imaging lens 1010 serves as an optical system which forms an optical image of an object on an image sensor 100, and a lens driving circuit 1009 performs, for example, zoom control, focus control, and stop control. The image sensor 100 receives, as an image signal, the object image formed by the imaging lens 1010, and has a configuration described in either of the first to sixth embodiments. A signal processing circuit 1003 performs various types of correction for the image signal output from the image sensor 100, or compresses data. A timing generation circuit 1002 outputs a driving timing signal to the image sensor 100. A central control/arithmetic circuit 1004 performs various types of arithmetic operations, and controls the overall image sensing apparatus. A memory circuit 1005 temporarily stores image data, and a display circuit 1006 displays various types of information or captured images. A recording circuit 1007 is a recording circuit from which, for example, a semiconductor memory is detachable for recording or reading out image data. An operation circuit 1008 electrically accepts the operation of a digital camera via an operation member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-156923, filed Jul. 12, 2012 and 2013-124174, filed Jun. 12, 2013, which are hereby incorporated by reference herein in their entirety.

What is claimed is:

1. An image sensor comprising:
a pixel portion formed by arraying pixels including photoelectric conversion portions in a matrix;
a combining portion which combines pixel signals from pixels on an identical row on different pixel columns to each other;
a plurality of A/D converters which are provided in a one-to-one correspondence to pixel columns of said pixel portion and converts combined pixel signals obtained by combining the pixel signals by said combining portion to digital signals; and
a distributing portion which distributes the combined pixel signals of plural different rows of the pixel portion to different A/D converters of said plurality of A/D converters, wherein the combined pixel signal of each row of the plural different rows is distributed to each of the different A/D converters in one-to-one correspondence,
wherein each of the different A/D converters converts the combined pixel signal of each row of the plural different rows to digital signal simultaneously.

2. The sensor according to claim 1, wherein said combining portion combines pixel signals from pixels of an identical color to each other.

3. The sensor according to claim 1, wherein each pixel column includes a plurality of column output lines, and pixels on an identical pixel column is connected to one of the plurality of column output lines.

4. The sensor according to claim 3, wherein said combining portion combines pixel signals from pixels of an identical color on different pixel columns to each other.

5. An image capturing apparatus comprising:
an image sensor according to claim 1;
a signal processor which applies a predetermined signal processing on the signal output from the image sensor; and
a display unit which displays an image based on the processed image signal.

6. An image sensor comprising:
a pixel portion formed by arraying pixels including photoelectric conversion portions in a matrix;
a combining portion which combines pixel signals from pixels on an identical row on different pixel columns to each other;
a plurality of A/D converters which are provided in a one-to-one correspondence to pixel columns of said pixel portion and converts combined pixel signals obtained by combining the pixel signals by said combining portion to digital signals; and
a connecting portion which inputs an identical combined pixel signal of a same row of the pixel portion to different A/D converters of said plurality of A/D converters,
wherein each of the different A/D converters converts the combined pixel signal of the same row to digital signal simultaneously.

7. The sensor according to claim 6, wherein said combining portion combines pixel signals from pixels of an identical color to each other.

8. The sensor according to claim 6, wherein each pixel column includes a plurality of column output lines, and pixels on an identical pixel column is connected to one of the plurality of column output lines.

9. The sensor according to claim 8, wherein said combining portion combines pixel signals from pixels of an identical color on different pixel columns to each other.

10. An image capturing apparatus comprising:
an image sensor according to claim 6;
a signal processor which applies a predetermined signal processsing processing on the signal output from the image sensor; and
a display unit which displays an image based on the processed image signal.

11. An image sensor comprising:
a pixel portion formed by arraying pixels including photoelectric conversion portions in a matrix and a plurality of column output lines;
a combining portion which combines pixel signals from pixels on an identical row on different pixel columns;
a plurality of A/D converters which converts combined pixel signals obtained by combining the pixel signals by said combining portion to digital signals; and
a distributing portion which distributes the combined pixel signals of plural different rows of the pixel portion to different A/D converters of said plurality of A/D converters, wherein the combined pixel signal of each row of the plural different rows is distributed to each of the different A/D converters in one-to-one correspondence, wherein the different A/D converters convert the combined pixel signals of the plural different rows to digital signals simultaneously.

12. The sensor according to claim 11, wherein said combining portion combines pixel signals from pixels of an identical color.

13. The sensor according to claim 11, wherein pixels on an identical pixel column is connected to at least one of the plurality of column output lines.

14. The sensor according to claim 13, wherein said combining portion combines pixel signals from pixels of an identical color on different pixel columns.

15. An image capturing apparatus comprising:
an image sensor according to claim 11;
a signal processor which applies a predetermined signal processing on the signal output from the image sensor; and
a display unit which displays an image based on the processed image signal.

16. An image sensor comprising:
a pixel portion formed by arraying pixels including photoelectric conversion portions in a matrix and a plurality of column output lines;
a combining portion which combines pixel signals from pixels on an identical row on different pixel columns;
a plurality of A/D converters which converts combined pixel signals obtained by combining the pixel signals by said combining portion to digital signals; and
a distributing portion which distributes identical combined pixel signal of a same row of the pixel portion to different A/D converters of said plurality of A/D converters,
wherein the different A/D converters convert the combined pixel signal of the same row to digital signals simultaneously.

17. The sensor according to claim 16, wherein said combining portion combines pixel signals from pixels of an identical color.

18. The sensor according to claim 16, wherein pixels on an identical pixel column is connected to at least one of the plurality of column output lines.

19. The sensor according to claim 18, wherein said combining portion combines pixel signals from pixels of an identical color on different pixel columns.

20. An image capturing apparatus comprising:
an image sensor according to claim 16;
a signal processor which applies a predetermined signal processing on the signal output from the image sensor; and
a display unit which displays an image based on the processed image signal.

* * * * *